US 8,737,801 B2

(12) United States Patent
Putterman et al.

(10) Patent No.: US 8,737,801 B2
(45) Date of Patent: May 27, 2014

(54) METHODS AND APPARATUS FOR CLIENT AGGREGATION OF TELEVISION PROGRAMMING IN A NETWORKED PERSONAL VIDEO RECORDING SYSTEM

(75) Inventors: Daniel Putterman, San Francisco, CA (US); Brad Dietrich, San Francisco, CA (US); Jeremy Toeman, San Francisco, CA (US); Pedro Freitas, San Francisco, CA (US); Ludovic Legrand, San Francisco, CA (US); Shawn McCaffrey, Belmont, CA (US); James Grimm, San Francisco, CA (US); Lijia Jin, Havward, CA (US); Paul Novaes, San Mateo, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 783 days.

(21) Appl. No.: 12/252,308

(22) Filed: Oct. 15, 2008

(65) Prior Publication Data
US 2009/0034935 A1 Feb. 5, 2009

Related U.S. Application Data

(63) Continuation of application No. 10/613,400, filed on Jul. 2, 2003, now Pat. No. 7,454,120.

(51) Int. Cl.
| H04N 5/931 | (2006.01) |
| H04N 5/932 | (2006.01) |
| H04N 5/935 | (2006.01) |
| H04N 5/76 | (2006.01) |
| H04N 7/18 | (2006.01) |
| H04N 7/173 | (2011.01) |

(52) U.S. Cl.
USPC ........... 386/212; 386/213; 386/214; 386/291; 386/297; 725/82; 725/91; 725/103; 725/114

(58) Field of Classification Search
USPC ............ 386/212, 213, 214, 291, 297; 725/82, 725/91, 103, 114
See application file for complete search history.

(56) References Cited

U.S. PATENT DOCUMENTS

| 4,063,220 A | 12/1977 | Metcalfe et al. |
| 4,079,419 A | 3/1978 | Siegle et al. |

(Continued)

FOREIGN PATENT DOCUMENTS

| DE | 4440419 | 5/1996 |
| EP | 0122626 | 10/1984 |

(Continued)

OTHER PUBLICATIONS

U.S. Appl. No. 10/613,470, filed Jul. 2, 2003, Putterman, et al.

(Continued)

*Primary Examiner* — Daquan Zhao
(74) *Attorney, Agent, or Firm* — Ropes & Gray LLP

(57) ABSTRACT

A networked personal video recording ("PVR") system couples a plurality of clients to one or more PVR media servers over a network. One or more PVR media servers include television tuners to tune television signals. A storage medium buffers the television signals to implement PVR functionality. For example, the PVR media server records television programs for clients. Clients are assigned to television tuners, and the clients display television programs received at the assigned tuner. The network transfers the buffered television signals to the clients.

31 Claims, 15 Drawing Sheets

(56) References Cited

U.S. PATENT DOCUMENTS

| | | |
|---|---|---|
| 4,081,754 A | 3/1978 | Jackson |
| 4,193,120 A | 3/1980 | Yello |
| 4,206,483 A | 6/1980 | Nakamura |
| 4,264,924 A | 4/1981 | Freeman |
| 4,264,925 A | 4/1981 | Freeman et al. |
| 4,267,563 A | 5/1981 | Sato et al. |
| 4,305,101 A | 12/1981 | Yarbrough et al. |
| 4,310,924 A | 1/1982 | Miyasaka et al. |
| 4,325,081 A | 4/1982 | Abe et al. |
| 4,334,242 A | 6/1982 | Marigold |
| 4,355,415 A | 10/1982 | George et al. |
| 4,390,901 A | 6/1983 | Keiser |
| 4,429,385 A | 1/1984 | Cichelli et al. |
| 4,435,842 A | 3/1984 | Mayumi et al. |
| 4,449,249 A | 5/1984 | Price |
| 4,475,153 A | 10/1984 | Kihara et al. |
| 4,488,179 A | 12/1984 | Kruger et al. |
| 4,519,003 A | 5/1985 | Scholz |
| 4,573,072 A | 2/1986 | Freeman |
| 4,593,414 A | 6/1986 | Koyanagi |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,621,259 A | 11/1986 | Schepers et al. |
| 4,625,080 A | 11/1986 | Scott |
| 4,631,601 A | 12/1986 | Brugliera et al. |
| 4,635,121 A | 1/1987 | Hoffman et al. |
| 4,641,205 A | 2/1987 | Beyers, Jr. |
| 4,694,490 A | 9/1987 | Harvey et al. |
| 4,706,121 A | 11/1987 | Young |
| 4,718,107 A | 1/1988 | Hayes |
| 4,751,578 A | 6/1988 | Reiter et al. |
| 4,755,883 A | 7/1988 | Uehira |
| 4,832,373 A | 5/1989 | Swan |
| 4,843,482 A | 6/1989 | Hegendorfer |
| 4,847,698 A | 7/1989 | Freeman |
| 4,847,700 A | 7/1989 | Freeman |
| 4,857,999 A | 8/1989 | Welsh |
| 4,879,611 A | 11/1989 | Fukui et al. |
| 4,885,579 A | 12/1989 | Sandbank |
| 4,899,370 A | 2/1990 | Kameo et al. |
| 4,908,707 A | 3/1990 | Kinghorn |
| 4,908,713 A | 3/1990 | Levine |
| 4,930,158 A | 5/1990 | Vogel |
| 4,945,563 A | 7/1990 | Horton et al. |
| 4,959,720 A | 9/1990 | Duffield et al. |
| 4,977,455 A | 12/1990 | Young |
| 5,036,314 A | 7/1991 | Barillari et al. |
| 5,038,211 A | 8/1991 | Hallenbeck |
| 5,047,867 A | 9/1991 | Strubbe et al. |
| 5,068,733 A | 11/1991 | Bennett |
| 5,105,184 A | 4/1992 | Pirani et al. |
| 5,109,279 A | 4/1992 | Ando |
| 5,134,719 A | 7/1992 | Mankovitz |
| 5,151,789 A | 9/1992 | Young |
| 5,155,591 A | 10/1992 | Wachob |
| 5,172,413 A | 12/1992 | Bradley et al. |
| 5,187,589 A | 2/1993 | Kono et al. |
| 5,195,134 A | 3/1993 | Inoue |
| 5,200,822 A | 4/1993 | Bronfin et al. |
| 5,210,611 A | 5/1993 | Yee et al. |
| 5,223,924 A | 6/1993 | Strubbe |
| RE34,340 E | 8/1993 | Freeman |
| 5,233,423 A | 8/1993 | Jernigan et al. |
| 5,241,428 A | 8/1993 | Goldwasser et al. |
| 5,253,066 A | 10/1993 | Vogel |
| 5,285,284 A | 2/1994 | Takashima et al. |
| 5,296,931 A | 3/1994 | Na |
| 5,323,234 A | 6/1994 | Kawasaki |
| 5,325,183 A | 6/1994 | Rhee |
| 5,335,277 A | 8/1994 | Harvey et al. |
| 5,353,121 A | 10/1994 | Young et al. |
| 5,371,551 A | 12/1994 | Logan et al. |
| 5,398,074 A | 3/1995 | Duffield et al. |
| 5,410,344 A | 4/1995 | Graves et al. |
| 5,412,720 A | 5/1995 | Hoarty |
| 5,414,455 A * | 5/1995 | Hooper et al. ............... 725/88 |
| 5,416,508 A | 5/1995 | Sakuma et al. |
| 5,432,561 A | 7/1995 | Strubbe |
| 5,434,626 A | 7/1995 | Hayashi et al. |
| 5,440,678 A | 8/1995 | Eisen et al. |
| 5,442,389 A | 8/1995 | Blahut et al. |
| 5,452,012 A | 9/1995 | Saitoh |
| 5,459,522 A | 10/1995 | Pint |
| 5,461,415 A | 10/1995 | Wolf et al. |
| 5,469,206 A | 11/1995 | Strubbe et al. |
| 5,479,266 A | 12/1995 | Young et al. |
| 5,479,268 A | 12/1995 | Young et al. |
| 5,479,302 A | 12/1995 | Haines |
| 5,479,497 A | 12/1995 | Kovarik |
| 5,483,278 A | 1/1996 | Strubbe et al. |
| 5,485,197 A | 1/1996 | Hoarty |
| 5,485,219 A | 1/1996 | Woo |
| 5,488,409 A | 1/1996 | Yuen et al. |
| 5,517,254 A | 5/1996 | Monta et al. |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,528,304 A | 6/1996 | Cherrick et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,541,662 A | 7/1996 | Adams et al. |
| 5,541,738 A | 7/1996 | Mankovitz |
| 5,543,852 A | 8/1996 | Yuen et al. |
| 5,543,929 A | 8/1996 | Mankovitz et al. |
| 5,550,576 A | 8/1996 | Klosterman |
| 5,557,338 A | 9/1996 | Maze et al. |
| 5,559,548 A | 9/1996 | Davis et al. |
| 5,559,549 A | 9/1996 | Hendricks et al. |
| 5,559,550 A | 9/1996 | Mankovitz |
| 5,568,272 A | 10/1996 | Levine |
| 5,581,614 A | 12/1996 | Ng et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmernians |
| 5,585,838 A | 12/1996 | Lawler et al. |
| 5,585,858 A | 12/1996 | Harper et al. |
| 5,585,866 A | 12/1996 | Miller et al. |
| 5,589,892 A | 12/1996 | Knee et al. |
| 5,592,551 A | 1/1997 | Lett et al. |
| 5,592,571 A | 1/1997 | Peters et al. |
| 5,594,509 A | 1/1997 | Florin et al. |
| 5,600,364 A | 2/1997 | Hendricks et al. |
| 5,602,582 A | 2/1997 | Wanderscheid et al. |
| 5,606,374 A | 2/1997 | Bertram |
| 5,617,565 A | 4/1997 | Augenbraun et al. |
| 5,619,274 A | 4/1997 | Roop et al. |
| 5,621,456 A | 4/1997 | Florin et al. |
| 5,621,579 A | 4/1997 | Yuen |
| 5,629,733 A | 5/1997 | Youman et al. |
| 5,630,067 A | 5/1997 | Kindell et al. |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten et al. |
| 5,635,989 A | 6/1997 | Rothmuller |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,414 A | 8/1997 | Lett et al. |
| 5,659,367 A | 8/1997 | Yuen |
| 5,661,516 A | 8/1997 | Carles |
| 5,666,498 A | 9/1997 | Amro |

(56) References Cited

U.S. PATENT DOCUMENTS

| | | |
|---|---|---|
| 5,666,645 A | 9/1997 | Thomas et al. |
| 5,671,225 A | 9/1997 | Hooper et al. |
| 5,684,525 A | 11/1997 | Klosterman |
| 5,689,666 A | 11/1997 | Berquist et al. |
| 5,694,163 A | 12/1997 | Harrison |
| 5,694,176 A | 12/1997 | Bruette et al. |
| 5,694,381 A | 12/1997 | Sako |
| 5,699,107 A | 12/1997 | Lawler et al. |
| 5,699,125 A | 12/1997 | Rzeszewski et al. |
| 5,701,383 A | 12/1997 | Russo et al. |
| 5,710,601 A | 1/1998 | Marshall et al. |
| 5,717,452 A | 2/1998 | Janin et al. |
| 5,724,091 A | 3/1998 | Freeman et al. |
| 5,724,203 A | 3/1998 | Kwoh et al. |
| 5,727,060 A | 3/1998 | Young |
| 5,732,216 A | 3/1998 | Logan et al. |
| 5,734,853 A | 3/1998 | Hendricks et al. |
| 5,737,028 A | 4/1998 | Bertram et al. |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,758,257 A | 5/1998 | Herz et al. |
| 5,760,821 A | 6/1998 | Ellis et al. |
| 5,761,607 A | 6/1998 | Gudesen |
| 5,768,528 A | 6/1998 | Stumm |
| 5,771,354 A | 6/1998 | Crawford |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,781,246 A | 7/1998 | Alten et al. |
| 5,790,198 A | 8/1998 | Roop et al. |
| 5,790,202 A | 8/1998 | Kummer et al. |
| 5,796,952 A | 8/1998 | Davis et al. |
| 5,801,747 A | 9/1998 | Bedard |
| 5,801,787 A | 9/1998 | Schein et al. |
| 5,802,284 A | 9/1998 | Karlton et al. |
| 5,805,155 A | 9/1998 | Allibhoy et al. |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,123 A | 9/1998 | Rowe et al. |
| 5,812,205 A | 9/1998 | Milnes et al. |
| 5,812,937 A | 9/1998 | Takahisa |
| 5,815,662 A | 9/1998 | Ong |
| 5,818,438 A | 10/1998 | Howe et al. |
| 5,819,019 A | 10/1998 | Nelson |
| 5,819,156 A | 10/1998 | Belmont |
| 5,822,123 A | 10/1998 | Davis et al. |
| 5,828,420 A | 10/1998 | Marshall et al. |
| 5,828,945 A | 10/1998 | Klosterman |
| 5,838,314 A | 11/1998 | Neel et al. |
| 5,841,938 A | 11/1998 | Nitta et al. |
| 5,844,620 A | 12/1998 | Coleman et al. |
| 5,850,218 A | 12/1998 | LaJoie et al. |
| 5,867,227 A | 2/1999 | Yamaguchi |
| 5,903,314 A | 5/1999 | Niijima et al. |
| 5,909,212 A | 6/1999 | Nishina et al. |
| 5,917,481 A | 6/1999 | Rzeszewski et al. |
| 5,940,073 A | 8/1999 | Klosterman et al. |
| 5,940,387 A | 8/1999 | Humpleman |
| 5,940,572 A | 8/1999 | Balaban et al. |
| 5,945,988 A | 8/1999 | Williams et al. |
| 5,949,954 A | 9/1999 | Young et al. |
| 5,959,592 A | 9/1999 | Petruzzelli |
| 5,963,264 A | 10/1999 | Jackson |
| 5,963,645 A | 10/1999 | Kigawa et al. |
| 5,970,486 A | 10/1999 | Yoshida et al. |
| 5,973,683 A | 10/1999 | Cragun et al. |
| 5,974,222 A | 10/1999 | Yuen et al. |
| 5,977,964 A | 11/1999 | Williams et al. |
| 5,987,213 A | 11/1999 | Mankovitz et al. |
| 5,991,799 A | 11/1999 | Yen et al. |
| 5,995,155 A | 11/1999 | Schindler et al. |
| 5,999,688 A | 12/1999 | Iggulden et al. |
| 6,002,394 A * | 12/1999 | Schein et al. .................. 725/39 |
| 6,005,561 A | 12/1999 | Hawkins et al. |
| 6,005,631 A | 12/1999 | Anderson et al. |
| 6,006,257 A | 12/1999 | Slezak |
| 6,020,880 A | 2/2000 | Naimpally |
| 6,020,883 A | 2/2000 | Herz et al. |
| 6,038,367 A | 3/2000 | Abecassis |
| 6,052,145 A | 4/2000 | Macrae et al. |
| 6,057,872 A | 5/2000 | Candelore |
| 6,057,890 A | 5/2000 | Virden et al. |
| 6,058,238 A | 5/2000 | Ng |
| 6,061,097 A | 5/2000 | Satterfield |
| 6,091,883 A | 7/2000 | Artigalas et al. |
| 6,091,884 A | 7/2000 | Yuen et al. |
| 6,094,680 A | 7/2000 | Hokanson |
| RE36,801 E | 8/2000 | Logan et al. |
| 6,115,057 A | 9/2000 | Kwoh et al. |
| 6,118,493 A | 9/2000 | Duhault et al. |
| 6,122,011 A | 9/2000 | Dias et al. |
| 6,125,230 A | 9/2000 | Yaqinuma |
| 6,125,231 A | 9/2000 | Yuen et al. |
| 6,130,726 A | 10/2000 | Darbee et al. |
| 6,133,910 A | 10/2000 | Stinebruner |
| 6,141,488 A | 10/2000 | Knudson et al. |
| 6,147,715 A | 11/2000 | Yuen et al. |
| 6,157,413 A | 12/2000 | Hanafee et al. |
| 6,163,316 A | 12/2000 | Killian |
| 6,167,188 A | 12/2000 | Young et al. |
| 6,172,674 B1 | 1/2001 | Etherdge |
| 6,177,931 B1 | 1/2001 | Alexander et al. |
| 6,208,335 B1 | 3/2001 | Gordon et al. |
| 6,208,799 B1 | 3/2001 | Marsh et al. |
| 6,219,839 B1 | 4/2001 | Sampsell |
| 6,233,389 B1 | 5/2001 | Barton et al. |
| 6,239,794 B1 | 5/2001 | Yuen et al. |
| 6,240,105 B1 | 5/2001 | Zetts |
| 6,240,241 B1 | 5/2001 | Yuen |
| 6,256,071 B1 | 7/2001 | Hiroi |
| 6,263,501 B1 | 7/2001 | Schein et al. |
| 6,275,648 B1 | 8/2001 | Knudson et al. |
| 6,289,346 B1 | 9/2001 | Milewski et al. |
| 6,292,624 B1 | 9/2001 | Saib et al. |
| 6,324,338 B1 | 11/2001 | Wood et al. |
| 6,326,982 B1 | 12/2001 | Wu et al. |
| 6,327,418 B1 | 12/2001 | Barton |
| 6,334,022 B1 | 12/2001 | Ohba et al. |
| 6,345,279 B1 | 2/2002 | Li et al. |
| 6,388,714 B1 | 5/2002 | Schein et al. |
| 6,414,725 B1 | 7/2002 | Clarin et al. |
| 6,434,614 B1 | 8/2002 | Blumenau |
| 6,441,832 B1 | 8/2002 | Tao et al. |
| 6,442,332 B1 | 8/2002 | Knudson et al. |
| RE37,881 E | 10/2002 | Haines |
| 6,470,319 B1 | 10/2002 | Ryan |
| 6,473,559 B1 | 10/2002 | Knudson et al. |
| 6,486,892 B1 | 11/2002 | Stern |
| 6,487,362 B1 | 11/2002 | Yuen et al. |
| 6,498,895 B2 | 12/2002 | Young et al. |
| 6,505,348 B1 | 1/2003 | Knowles et al. |
| 6,532,589 B1 | 3/2003 | Proehl et al. |
| 6,549,715 B1 | 4/2003 | Sasaki |
| 6,564,005 B1 | 5/2003 | Berstis |
| 6,564,378 B1 | 5/2003 | Satterfield et al. |
| 6,574,716 B2 | 6/2003 | Dovi |
| 6,601,237 B1 | 7/2003 | Ten Kate et al. |
| 6,640,145 B2 | 10/2003 | Hoffberg et al. |
| 6,670,971 B1 | 12/2003 | Oral |
| 6,678,737 B1 | 1/2004 | Bucher |
| 6,721,954 B1 | 4/2004 | Nickum |
| 6,725,253 B1 | 4/2004 | Okano et al. |
| 6,727,914 B1 | 4/2004 | Gutta |
| 6,744,967 B2 | 6/2004 | Kaminski et al. |
| 6,748,481 B1 | 6/2004 | Parry et al. |
| 6,756,997 B1 | 6/2004 | Ward, III et al. |
| 6,772,433 B1 | 8/2004 | LaJoie et al. |
| 6,788,882 B1 | 9/2004 | Geer et al. |

(56) References Cited

U.S. PATENT DOCUMENTS

| | | |
|---|---|---|
| 6,789,204 B2 | 9/2004 | Abdelnur et al. |
| 6,792,197 B1 | 9/2004 | Helmstetter |
| 6,820,278 B1 | 11/2004 | Ellis |
| 6,850,693 B2 | 2/2005 | Young et al. |
| 6,853,728 B1 | 2/2005 | Kahn et al. |
| 6,857,130 B2 | 2/2005 | Srikantan et al. |
| 6,934,964 B1 | 8/2005 | Schaffer et al. |
| 6,961,511 B2 | 11/2005 | Ohno et al. |
| 6,977,897 B1 | 12/2005 | Nelson et al. |
| 7,088,910 B2 | 8/2006 | Potrebic et al. |
| 7,089,321 B2 | 8/2006 | Hayashi et al. |
| 7,089,348 B2 | 8/2006 | Parry et al. |
| 7,096,486 B1 | 8/2006 | Ukai et al. |
| 7,116,894 B1 * | 10/2006 | Chatterton .................... 386/211 |
| 7,130,623 B2 | 10/2006 | Kirkeby et al. |
| 7,139,868 B2 | 11/2006 | Parry et al. |
| 7,143,170 B2 | 11/2006 | Swildens et al. |
| 7,151,886 B2 | 12/2006 | Young et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,209,640 B2 | 4/2007 | Young et al. |
| 7,243,364 B2 | 7/2007 | Dunn et al. |
| 7,293,276 B2 | 11/2007 | Phillips et al. |
| 7,298,960 B1 | 11/2007 | Taylor et al. |
| 7,430,753 B2 | 9/2008 | Gray et al. |
| 7,454,120 B2 | 11/2008 | Putterman et al. |
| 7,457,511 B2 | 11/2008 | Putterman et al. |
| 7,477,832 B2 | 1/2009 | Young et al. |
| 7,546,363 B2 | 6/2009 | Harrow et al. |
| 7,603,022 B2 | 10/2009 | Putterman et al. |
| 7,640,564 B2 | 12/2009 | Green et al. |
| 7,650,621 B2 | 1/2010 | Thomas et al. |
| 7,739,709 B2 | 6/2010 | Ellis et al. |
| 7,779,445 B2 | 8/2010 | Ellis |
| 7,840,977 B2 | 11/2010 | Walker et al. |
| 7,930,431 B2 * | 4/2011 | Kuroiwa et al. ............... 709/246 |
| 8,438,601 B2 | 5/2013 | Putterman et al. |
| 2001/0043795 A1 | 11/2001 | Wood et al. |
| 2002/0010917 A1 | 1/2002 | Srikantan et al. |
| 2002/0016818 A1 | 2/2002 | Kirani et al. |
| 2002/0059599 A1 | 5/2002 | Schein et al. |
| 2002/0059621 A1 | 5/2002 | Thomas et al. |
| 2002/0073229 A1 * | 6/2002 | Hayashi ........................ 709/237 |
| 2002/0090203 A1 | 7/2002 | Mankovitz |
| 2002/0152311 A1 | 10/2002 | Veltman et al. |
| 2002/0174430 A1 | 11/2002 | Ellis et al. |
| 2002/0184451 A1 | 12/2002 | Dovi |
| 2002/0191954 A1 | 12/2002 | Beach et al. |
| 2002/0194585 A1 | 12/2002 | Connelly |
| 2002/0194598 A1 | 12/2002 | Connelly |
| 2002/0194607 A1 | 12/2002 | Connelly |
| 2003/0009766 A1 | 1/2003 | Marolda |
| 2003/0020744 A1 | 1/2003 | Ellis et al. |
| 2003/0046057 A1 | 3/2003 | Okunishi et al. |
| 2003/0086023 A1 | 5/2003 | Chung et al. |
| 2003/0110499 A1 | 6/2003 | Knudson et al. |
| 2003/0118323 A1 | 6/2003 | Ismail et al. |
| 2003/0149980 A1 | 8/2003 | Hassell et al. |
| 2003/0149988 A1 | 8/2003 | Ellis et al. |
| 2003/0154486 A1 | 8/2003 | Dunn et al. |
| 2003/0154493 A1 * | 8/2003 | Kagle et al. .................... 725/114 |
| 2003/0204848 A1 | 10/2003 | Cheng |
| 2003/0204856 A1 | 10/2003 | Buxton |
| 2003/0210898 A1 | 11/2003 | Juen et al. |
| 2004/0008971 A1 | 1/2004 | Young et al. |
| 2004/0013406 A1 | 1/2004 | Barton et al. |
| 2004/0107236 A1 | 6/2004 | Nakagawa et al. |
| 2004/0128686 A1 | 7/2004 | Boyer et al. |
| 2004/0163130 A1 | 8/2004 | Gray et al. |
| 2004/0181814 A1 | 9/2004 | Ellis et al. |
| 2004/0186901 A1 | 9/2004 | Guigui |
| 2004/0215757 A1 | 10/2004 | Butler |
| 2004/0218905 A1 | 11/2004 | Green et al. |
| 2004/0221019 A1 | 11/2004 | Swildens |
| 2004/0221302 A1 | 11/2004 | Ansari et al. |
| 2004/0268407 A1 | 12/2004 | Sparrell et al. |
| 2005/0002638 A1 | 1/2005 | Putterman et al. |
| 2005/0002640 A1 | 1/2005 | Putterman et al. |
| 2005/0005300 A1 | 1/2005 | Putterman et al. |
| 2005/0010671 A1 | 1/2005 | Grannan |
| 2005/0028208 A1 | 2/2005 | Ellis et al. |
| 2005/0044567 A1 | 2/2005 | Young et al. |
| 2005/0102698 A1 | 5/2005 | Bumgardner et al. |
| 2005/0149964 A1 | 7/2005 | Thomas et al. |
| 2005/0152669 A1 | 7/2005 | Kim et al. |
| 2005/0204388 A1 | 9/2005 | Knudson et al. |
| 2005/0240968 A1 | 10/2005 | Knudson et al. |
| 2005/0251827 A1 | 11/2005 | Ellis et al. |
| 2005/0273819 A1 | 12/2005 | Knudson et al. |
| 2005/0283547 A1 | 12/2005 | Parry et al. |
| 2006/0018625 A1 | 1/2006 | Johnson et al. |
| 2006/0039361 A1 | 2/2006 | Ohno et al. |
| 2006/0080415 A1 | 4/2006 | Tu |
| 2006/0101417 A1 | 5/2006 | Hoh |
| 2006/0114360 A1 | 6/2006 | Kortum et al. |
| 2006/0136965 A1 | 6/2006 | Ellis et al. |
| 2006/0140584 A1 | 6/2006 | Ellis et al. |
| 2006/0179462 A1 | 8/2006 | Willame et al. |
| 2007/0058924 A1 | 3/2007 | Yeh |
| 2007/0067800 A1 | 3/2007 | Wachtfogel et al. |
| 2007/0101377 A1 | 5/2007 | Six et al. |
| 2007/0104456 A1 | 5/2007 | Craner et al. |
| 2007/0157234 A1 | 7/2007 | Walker |
| 2007/0157241 A1 | 7/2007 | Walker |
| 2007/0157266 A1 | 7/2007 | Ellis et al. |
| 2007/0199030 A1 | 8/2007 | Ellis et al. |
| 2008/0115169 A1 | 5/2008 | Ellis et al. |
| 2008/0184327 A1 | 7/2008 | Ellis et al. |
| 2009/0074380 A1 | 3/2009 | Boston et al. |
| 2009/0222875 A1 | 9/2009 | Cheng et al. |
| 2010/0074600 A1 | 3/2010 | Putterman et al. |
| 2010/0175086 A1 | 7/2010 | Gaydou et al. |

FOREIGN PATENT DOCUMENTS

| | | |
|---|---|---|
| EP | 0133985 | 3/1985 |
| EP | 2262253 | 4/1988 |
| EP | 0424469 | 5/1991 |
| EP | 0572090 | 12/1993 |
| EP | 0682452 | 11/1995 |
| EP | 0753964 | 1/1997 |
| EP | 0762756 | 3/1997 |
| EP | 0763938 | 3/1997 |
| EP | 0836320 | 4/1998 |
| EP | 0843468 | 5/1998 |
| EP | 0848554 | 6/1998 |
| EP | 0854645 | 7/1998 |
| EP | 0874524 | 10/1998 |
| EP | 0940983 | 9/1999 |
| EP | 0940985 | 9/1999 |
| EP | 1280122 | 1/2003 |
| EP | 1355496 | 10/2003 |
| EP | 1387272 | 2/2004 |
| EP | 1473934 | 11/2004 |
| GB | 2227622 A | 8/1990 |
| GB | 2229595 A | 9/1990 |
| GB | 2346251 A | 8/2000 |
| JP | 06-111413 | 4/1994 |
| JP | 06-303541 | 10/1994 |
| JP | 09-289630 | 11/1997 |
| JP | 10-042242 | 2/1998 |
| JP | 10-112087 | 4/1998 |
| JP | 10-164487 | 6/1998 |
| JP | 11-088280 | 3/1999 |
| JP | 11-136615 | 5/1999 |
| JP | 11-266414 | 9/1999 |
| JP | 11-313280 | 11/1999 |
| JP | 11-353071 | 12/1999 |
| JP | 2000-013708 | 1/2000 |
| JP | 2000-138886 | 5/2000 |
| JP | 2000-224533 | 8/2000 |
| JP | 2000-235546 | 8/2000 |
| JP | 2000-306314 | 11/2000 |

(56) References Cited

FOREIGN PATENT DOCUMENTS

| | | |
|---|---|---|
| JP | 2001-088372 | 4/2001 |
| JP | 2001-165669 | 6/2001 |
| JP | 2001-167522 | 6/2001 |
| JP | 2001-257950 | 9/2001 |
| JP | 2001-346137 | 12/2001 |
| JP | 2002-185951 | 6/2002 |
| JP | 2003-199004 | 7/2003 |
| JP | 2003-304503 | 10/2003 |
| JP | 2004-007592 A | 1/2004 |
| JP | 2004-23326 A | 1/2004 |
| JP | 2009-515437 | 4/2009 |
| TW | 247388 | 10/1994 |
| WO | WO 88/04507 | 6/1988 |
| WO | WO 90/00847 | 1/1990 |
| WO | WO 90/07844 | 7/1990 |
| WO | WO 91/00670 | 1/1991 |
| WO | WO 91/07050 | 5/1991 |
| WO | WO 92/04801 | 3/1992 |
| WO | WO 92/22983 | 12/1992 |
| WO | WO 93/04473 | 3/1993 |
| WO | WO 93/08542 | 4/1993 |
| WO | WO 93/23957 | 11/1993 |
| WO | WO 94/13284 | 6/1994 |
| WO | WO 94/14284 | 6/1994 |
| WO | WO 95/01058 | 1/1995 |
| WO | WO 95/04431 | 2/1995 |
| WO | WO 95/11567 | 4/1995 |
| WO | WO 95/18449 | 7/1995 |
| WO | WO 95/31069 | 11/1995 |
| WO | WO 95/32584 | 11/1995 |
| WO | WO 95/32585 | 11/1995 |
| WO | WO 95/32587 | 11/1995 |
| WO | WO 96/09721 | 3/1996 |
| WO | WO 96/13932 | 5/1996 |
| WO | WO 96/25821 | 8/1996 |
| WO | WO 96/26605 | 8/1996 |
| WO | WO 96/27982 | 9/1996 |
| WO | WO 96/31980 | 10/1996 |
| WO | WO 96/33572 | 10/1996 |
| WO | WO 96/34491 | 10/1996 |
| WO | WO 96/36172 | 11/1996 |
| WO | WO 96/37075 | 11/1996 |
| WO | WO 96/41418 | 12/1996 |
| WO | WO 96/41472 | 12/1996 |
| WO | WO 96/41478 | 12/1996 |
| WO | WO 97/13368 | 4/1997 |
| WO | WO 97/31479 | 8/1997 |
| WO | WO 97/32434 | 9/1997 |
| WO | WO 97/34413 | 9/1997 |
| WO | WO 97/34414 | 9/1997 |
| WO | WO 97/40623 | 10/1997 |
| WO | WO 97/42763 | 11/1997 |
| WO | WO 97/46016 | 12/1997 |
| WO | WO 97/46943 | 12/1997 |
| WO | WO 97/47124 | 12/1997 |
| WO | WO 97/48228 | 12/1997 |
| WO | WO 97/48230 | 12/1997 |
| WO | WO 97/49237 | 12/1997 |
| WO | WO 97/49242 | 12/1997 |
| WO | WO 98/01995 | 1/1998 |
| WO | WO 98/06219 | 2/1998 |
| WO | WO 98/07277 | 2/1998 |
| WO | WO 98/10589 | 3/1998 |
| WO | WO 98/12872 | 3/1998 |
| WO | WO 98/16056 | 4/1998 |
| WO | WO 98/17064 | 4/1998 |
| WO | WO 98/26584 | 6/1998 |
| WO | WO 98/26594 | 6/1998 |
| WO | WO 98/26596 | 6/1998 |
| WO | WO 98/38831 | 9/1998 |
| WO | WO 98/39893 | 9/1998 |
| WO | WO 98/43183 | 10/1998 |
| WO | WO 98/47279 | 10/1998 |
| WO | WO 98/47283 | 10/1998 |
| WO | WO 98/47287 | 10/1998 |
| WO | WO 98/47289 | 10/1998 |
| WO | WO 99/03267 | 1/1999 |
| WO | WO 99/12346 | 3/1999 |
| WO | WO 99/45700 | 9/1999 |
| WO | WO 99/52279 | 10/1999 |
| WO | WO 99/57839 | 11/1999 |
| WO | WO 99/60790 | 11/1999 |
| WO | WO 99/66725 | 12/1999 |
| WO | WO 00/04706 | 1/2000 |
| WO | WO 00/07368 | 2/2000 |
| WO | WO 00/08850 | 2/2000 |
| WO | WO 00/08851 | 2/2000 |
| WO | WO 00/08852 | 2/2000 |
| WO | WO 00/11869 | 3/2000 |
| WO | WO 00/16548 | 3/2000 |
| WO | WO 00/28739 | 5/2000 |
| WO | WO 00/35193 | 6/2000 |
| WO | WO 00/58833 | 10/2000 |
| WO | WO 00/58967 | 10/2000 |
| WO | WO 00/59214 | 10/2000 |
| WO | WO 00/59223 | 10/2000 |
| WO | WO 00/62298 | 10/2000 |
| WO | WO 00/62299 | 10/2000 |
| WO | WO 00/62533 | 10/2000 |
| WO | WO 00/67475 | 11/2000 |
| WO | WO 01/03088 | 1/2001 |
| WO | WO 01/22729 | 3/2001 |
| WO | WO 01/46843 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/47279 | 6/2001 |
| WO | WO 01/76239 | 10/2001 |
| WO | WO 01/76248 | 10/2001 |
| WO | WO 01/86511 | 11/2001 |
| WO | WO 02/069636 | 9/2002 |
| WO | WO 02/078317 | 10/2002 |
| WO | WO 03/026187 | 3/2003 |
| WO | WO 03/032620 | 4/2003 |
| WO | WO 03/047235 | 6/2003 |
| WO | WO 2004/059528 | 7/2004 |
| WO | WO 2008/042242 | 4/2008 |

OTHER PUBLICATIONS

U.S. Appl. No. 10/613,400, filed Jul. 2, 2003, Putterman, et al.
U.S. Appl. No. 10/613,999, filed Jul. 8, 2003, Yamamoto, et al.
U.S. Appl. No. 10/613,401, filed Jul. 2, 2003, Putterman, et al.
Article: "Automatic Windows 98/ME TCP/IP Addressing without a DHCP Server" Oct. 20, 2000.
"DirecTV Digital Satellite Receiver—Operating Instructions," Sony Electronics Inc. (2001).
"DirecTV Receiver —Owner's Manual," DirecTV, Inc. (2002).
"DirecTV Receiver with TiVo Digital Satellite Receiver/Recorder SAT-T60—Installation Guide," Sony Corporation (2000).
"DirecTV Receiver with TiVo Installation Guide," Philips (2000).
"DirecTV Receiver with TiVo Viewers Guide" (1999, 2000).
"DishPro Satellite System—Users Guide," Dish Network, (undated), accessed 2008.
"Fall 2001 TiVo Service Update with Dual Tuner!," TiVo Inc. (2001).
"PTV Recorder Setup Guide," Philips (2000).
"RCA Satellite Receiver User's Guide," Thomson Multimedia Inc. (2001).
"Start Here," Sony, TiVo and DirecTV, (undated), accessed 2008.
"Universal Plug and Play Device Artchitecture," Version 1.0 (Jun. 8, 2000).
"VPV—Videotext Programs Videorecorder", by Bensch, IEEE Jun. 1988, pp. 788-792.
Advanced Analog Systems—Addressable Terminals, General Instrument Corp. of Horsham, Pennsylvania (URL:http//www.gi.com/BUSAREA/ANALOG/TERMINAL/WATCH/watch.html), Printed from the Internet on Mar. 4, 1999.
Digital Video Broadcasting (DVB); DVB specification for data broadcasting, European Telecommunications Standards Institute, Draft EN 301 192 V1.2.1 (Jan. 1999).

(56) References Cited

OTHER PUBLICATIONS

Electronic Programme Guide (EPG); Protocol for a TV Guide using electronic data transmission, by European Telecommunication Standards Institute, May 1997, Valbonne, France, publication No. ETS 300 707.

Goland et al., Simple Service Discovery Protocol/1.0 Operating Without an Arbiter <draft-cai-ssdp-v1-03.txt>, SSDP Draft Standard. (Oct. 28, 1999) http://tools.ietf.org/html/draft-cai-ssdp-v1-03.

Gong, A Software Architecture for Open Service Gateways, IEEE Internet Computing, Jan.-Feb. 2001 (FROM UV-449).

Hofmann et al., Videotext Programmiert Videorecorder, Rundfunktechnische Mitteilungen, Nov.-Dec. 1982, pp. 254-257 (translation attached).

http://www.iapplianceweb.com/story/OEG20040510N0003BC.htm (May 11, 2004).

Inside I-Guide User's Manual (Aug. 24, 2004).

Jaeger, Set-top Box Software Architecture for Digital Video Broadcast and Interative Services, IEEE 2001 (FROM UV-449).

Rewind, replay and unwind with new high-tech TV devices, *LA Times, Magid*. This document was printed from the Internet on Jun. 6, 1999 and bears a date of May 19, 1999.

Markoff, 2 Makers Plan Introductions of Digital VCR, *The New York Times,* Mar. 29, 1999.

Monaco et al., "Remote Device Command Resource Sharing over the Internet: A New Approach Based on a Distributed Layered Architecture," IEEE Transaction on Computers, vol. 51, No. 7, Jul. 2002, pp. 787-792.

Saito, Takeshi, et al., "Homenetwork Architecture Considering Digital Home Appliance," Technical Committee meeting of The Institute of Electronics, Information and Communication Engineers (IEICE), Japan, Nov. 6, 1997, vol. 97, No. 368, p. 57-64.

TivoToGo™ Transfers (printed Mar. 8, 2006).

User's Guide RCA Color TV with TV Plus + Guide, 1997.

Windows 98 Feature Combines TV, Terminal and the Internet, *The New York Times,* Aug. 18, 1998.

Wittress et al., Internet Protocol (IP) Set-Top Boxes, Microsoft Windows Embedded IP Set-Top Boxes, Microsoft Corporation, Sep. 2003.

\* cited by examiner

METHODS AND APPARATUS FOR CLIENT AGGREGATION OF TELEVISION PROGRAMMING IN A NETWORKED PERSONAL VIDEO RECORDING SYSTEM

RELATED APPLICATIONS

This patent application claims benefit to and is a continuation of the United States patent application entitled "METHODS AND APPARATUS FOR CLIENT AGGREGATION OF TELEVISION PROGRAMMING IN A NETWORKED PERSONAL VIDEO RECORDING SYSTEM," having Ser. No. 10/613,400, filed on Jul. 2, 2003, now U.S. Pat. No. 7,454,120.

BACKGROUND OF THE INVENTION

1. Field of the Invention

The present invention is directed toward the field of video recording, and more particularly toward a networked personal video recording system.

2. Art Background

Typically, a personal video recorder ("PVR") includes a storage device, such as a hard disk drive, and a television input. Similar to a video cassette recorder, the PVR system permits a user to record television programming. Specifically, the PVR system stores a digital representation of television signals on the storage device for subsequent replay by the user. The PVR system also buffers live television. For this application, television signals are stored on the storage device and output to a television for viewing by a user. The function of buffering television permits a user to seemingly manipulate live television. For example, a user may pause, rewind, and, to a limited extent, fast forward the live television signal. Due to the numerous functions and features, PVR systems have become very popular. However, these PVR systems typically operate on a signal television signal for subsequent display on a single television. As such, it is desirable to develop a PVR system that effectively integrates one or more television inputs with a network of televisions.

SUMMARY OF THE INVENTION

A personal video recording ("PVR") system aggregates television programming information from multiple sources. The PVR system includes at least one PVR media server. A network couples a plurality of clients to a PVR media server. The PVR media server tunes television signals in a plurality of tuners. The television signals are buffered in a storage medium. To aggregate television programming information, a client generates a request for a list of television programming from each of the PVR media servers on the network. In response, PVR media servers transmit a list of television programming available through their respective PVR media servers. The requesting client aggregates a list of the television programming information available within the PVR system.

In one embodiment, the PVR system aggregates a list of television programming across a plurality of PVR media servers, a plurality of television tuners, and/or a plurality of television service providers. The television programming information may identify either live television or television programs previously stored on the storage medium. The PVR system aggregates television programming to permit viewing the information by channel, time slots, television show genre, television show episodes, and actors appearing in television shows.

DETAILED DESCRIPTION

Figure 1:
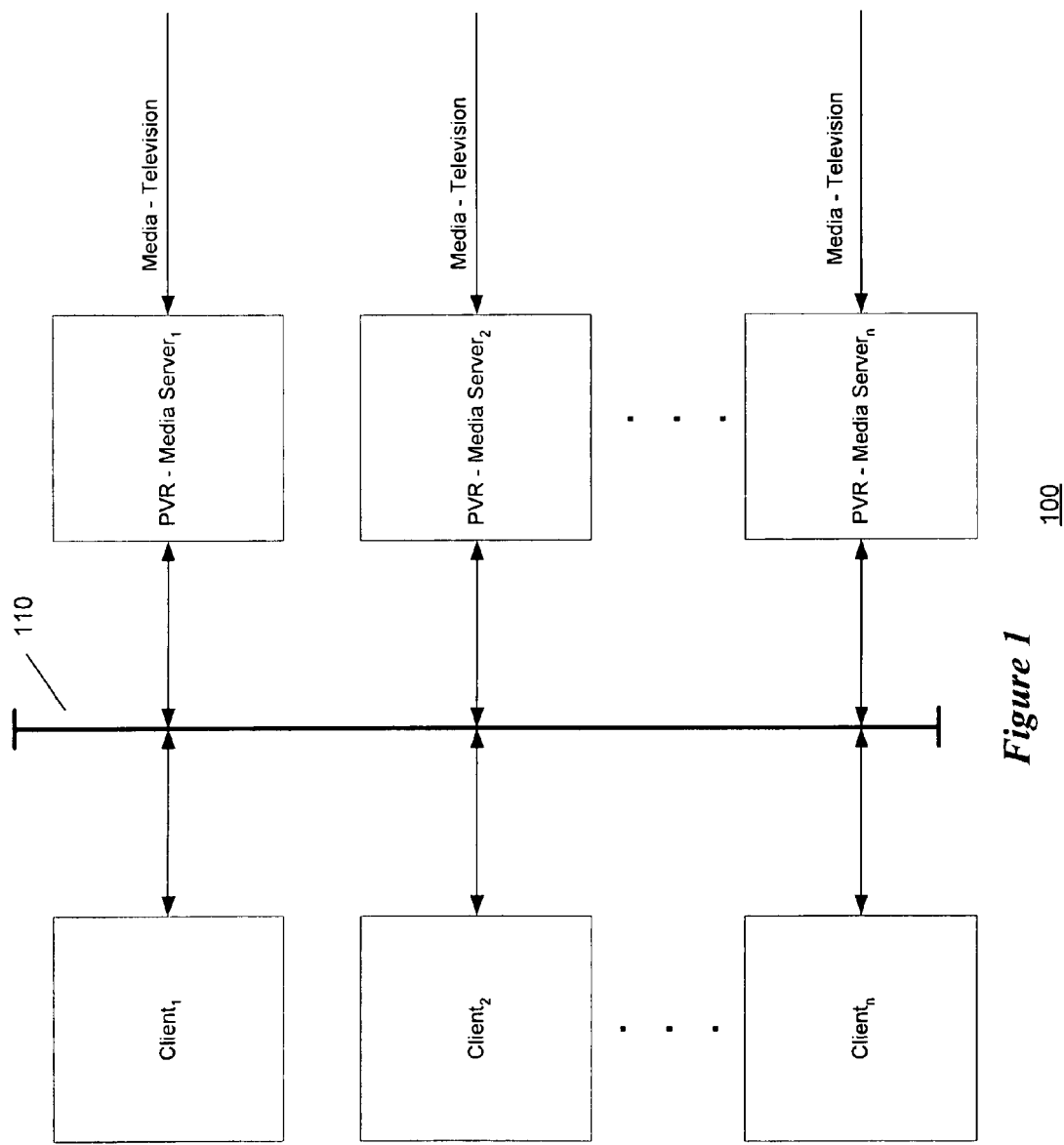
FIG. 1 is a block diagram illustrating one embodiment for the networked PVR system of the present invention.

FIG. 1 is a block diagram illustrating one embodiment for the networked PVR system of the present invention. For this embodiment, a home entertainment system includes "n" clients and "m" personal video recording ("PVR")-media servers (i.e., "n" and "m" are any integer values greater than or equal to one). A client, as used herein, is any device that plays back media. For example, a client may comprise a television to playback video and live television. A server, as used herein, connotes any device that stores or acquires media. A PVR-media server connotes any device that delivers video to the network, including a device that acquires television signals and buffers television signals for viewing by the clients. For example, a PVR-media server may comprise a device with storage, designed specifically to minimize cost or a PVR-media server may comprise a personal computer.

As shown in FIG. 1, different types of media, including television signals, are input to each PVR-media server. The PVR-media servers may store media, including audio and video, for access by the clients. In addition, the PVR-media servers buffer live television. Each client (e.g., client$_1$, client$_2$ and client$_n$) may access media stored or buffered on the PVR-media servers via network 110. Network 110 may comprise any type of network, including wireless networks. For example, network 110 may comprise networks implemented in accordance with standards, such as IEEE 802.3, Ethernet 10/100 on Category 5, HPNA, Home Plug, IEEE 802.11x, IEEE 1394, and USB 1.1/2.0.

The networked system 100, shown in FIG. 1, may be implemented in a residence. For example, each client may consist of a television for viewing stored video and television.

Such an example home system may include a client television located in the living room, one or more client televisions located in bedrooms, and a client television located in the kitchen. In general, system 100 permits any client to playback media (e.g., video) stored or acquired through any of the PVR-media servers. The PVR-media servers may be configured to acquire television signals from different sources. For example, PVR-media server$_1$ may acquire a television signal from a satellite television system, whereas PVR-media server$_2$ may acquire a television signal from a cable television system. A PVR-media server includes permanent storage (e.g., hard disk drive) and at least one television tuner. Thus, system 100 permits any client to access media from any tuner or media stored on any PVR-media server.

Figure 2:
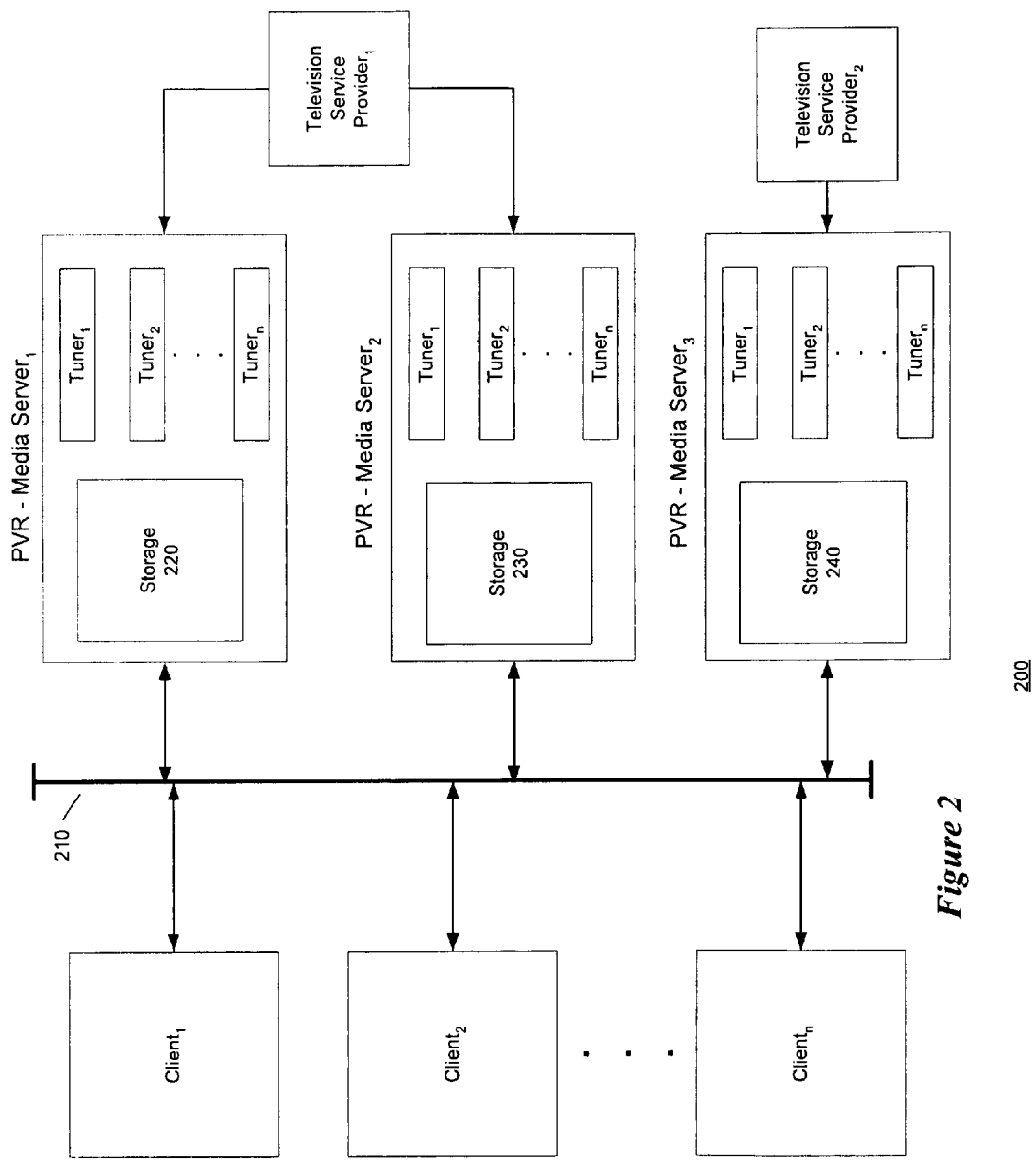
FIG. 2 is a block diagram illustrating one embodiment for the networked PVR system of the present invention.

FIG. 2 is a block diagram illustrating one embodiment for the networked PVR system of the present invention. Similar to system 100 of FIG. 1, system 200 includes "n" clients, including at least two televisions. For this example system, there are three PVR-media servers (PVR-media server$_1$, PVR-media server$_2$, and PVR-media server$_3$). The clients access media (e.g., video) through network 210. Each PVR-media server includes storage (220, 230 and 240) and "n" tuners (i.e., "n" represents any integer greater than or equal to one). The PVR-media servers receive a television signal. For this example, PVR-media server$_1$ and PVR-media server$_2$ receive a signal from television service provider$_1$, and PVR-media server$_3$ receives a television signal from television service provider$_2$. Under this configuration, any client (i.e., client$_1$, client$_2$, and client$_n$) may receive an output video signal demodulated by any tuner (i.e., any one of "n" tuners from PVR-media server$_1$, PVR-media server$_2$, and PVR-media server$_3$).

Figure 3:
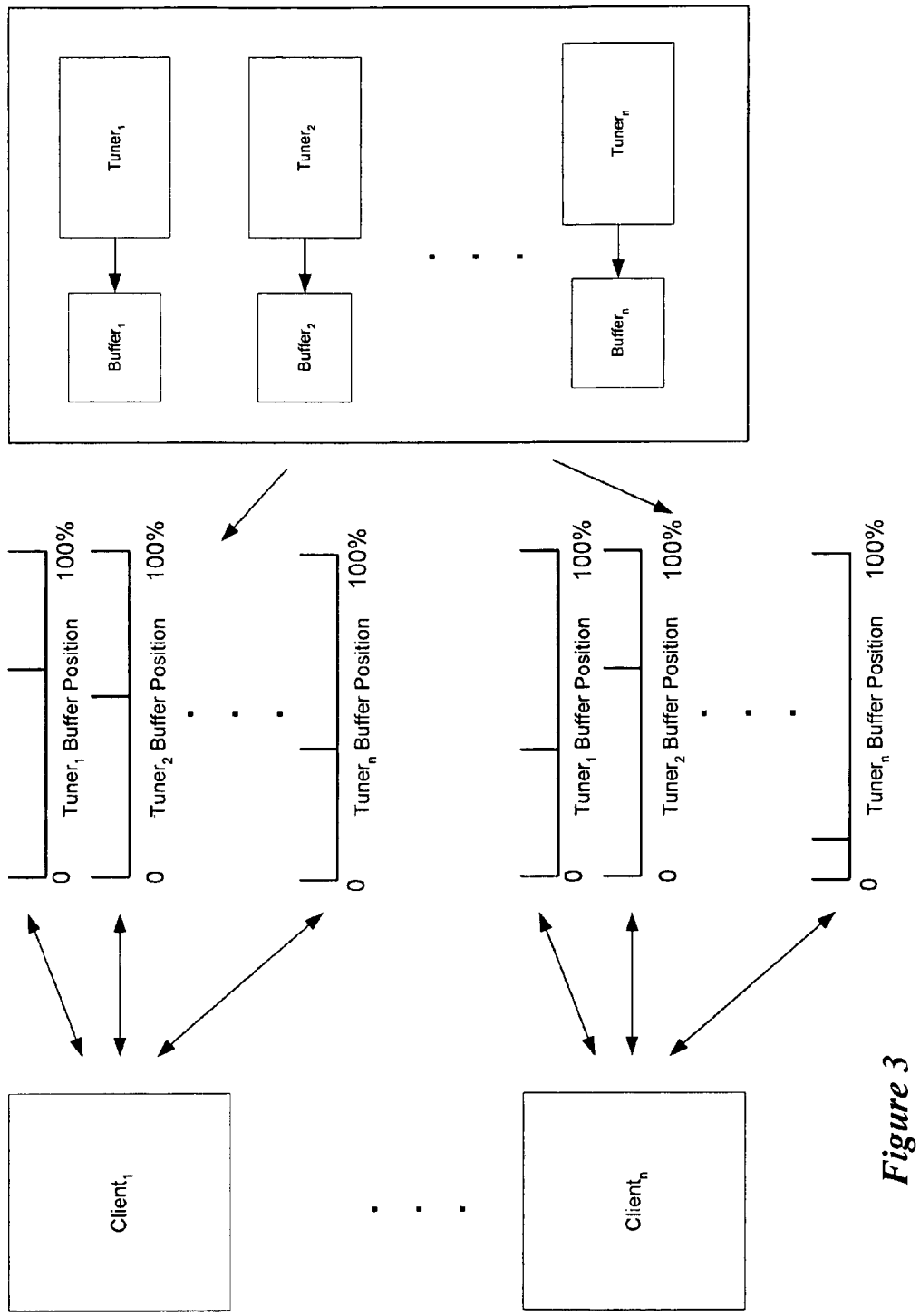
FIG. 3 is a block diagram illustrating one embodiment of television signal buffering for the networked PVR system.

FIG. 3 is a block diagram illustrating one embodiment of television signal buffering for the networked PVR system. Every tuner has a continuous ring buffer. In one embodiment, the size of the ring buffer is flexible, and may be configured. For example, the ring buffer may permit storage of sixty (60) minutes of television. In turn, each client has an independent buffer position for every ring buffer and stored video available in the system. FIG. 3 illustrates an example networked PVR system with "n" tuners. The "n" tuners may be implemented in conjunction with one or more PVR-media servers. As shown in FIG. 3, the output of each tuner is input to a corresponding buffer (e.g., ring buffer). Each client, client$_{1-n}$, has an associated buffer position for each tuner-buffer pair. Specifically, as shown in FIG. 3, client$_1$ has buffer positions for tuner$_1$, tuner$_2$, and tuner$_n$. Similarly, client$_n$ also has independent buffer positions for tuners 1-n. In general, a buffer position may comprise a pointer to a position within a video or to a position within a tuner buffer. Each tuner buffer position is depicted in FIG. 3 as a timeline, wherein the beginning and end line segments represent the length of the buffer, and the center line segments represent the clients current buffer position.

Figure 4:
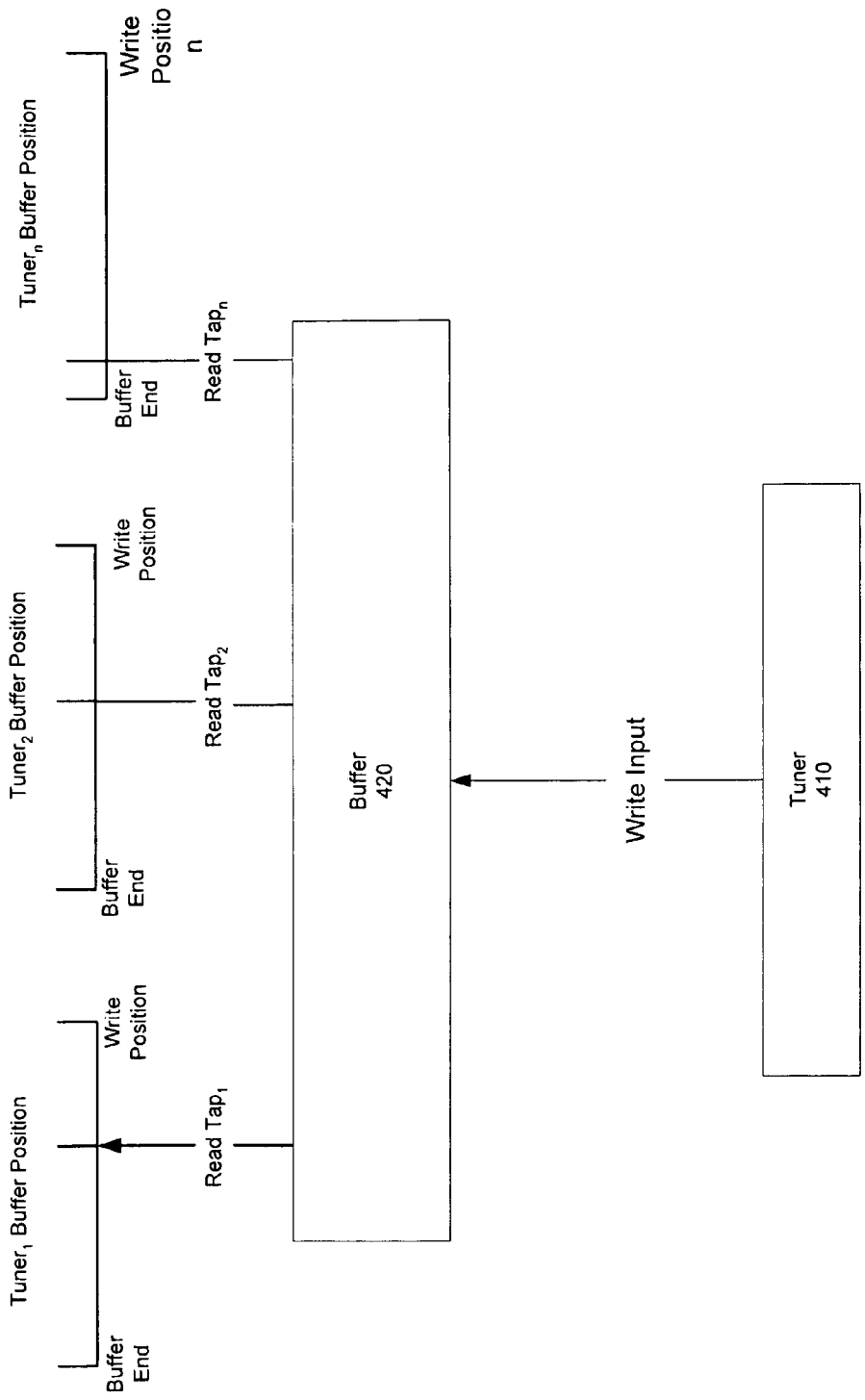
FIG. 4 is a block diagram illustrating on embodiment for a buffer in the networked PVR system.

A buffer in the networked PVR system includes a write tap and a plurality of read taps. FIG. 4 is a block diagram illustrating on embodiment for a buffer in the networked PVR system. A tuner 410 outputs data (e.g., MPEG encoded video) for storage on buffer 420. In one embodiment, the buffer comprises a hard disk drive. The tuner 410 may write to the hard disk drive using a file system. In other embodiments, the tuner 410 may execute direct write operations on the hard disk drive. The buffer has a plurality of read taps. For the example shown in FIG. 4, the buffer has "n" read taps (i.e., "n" represents any integer greater than or equal to one). Each read tap supports an independent buffer position. For example, read tap$_1$ supports tuner buffer position$_1$, read tap$_2$ supports tuner buffer position$_2$, and read tap$_n$ supports tuner buffer position$_n$. In one software embodiment, the software conducts multiple read operations on a file to generate the multiple taps.

In one embodiment, the system sets boundary conditions on the relative positions of read and write buffer taps. One boundary condition requires that the read tap not fall behind the write tap an amount greater than the buffer length. For example, a client may view a buffered television program using a first buffer position (i.e., read tap). For this example, a client may pause the viewing of the television program. If this occurs, the first buffer position is constant (i.e., the first buffer position is not advanced). However, the write position is advanced as the television signal is received. Therefore, the distant between the write buffer position and the read buffer position is increased. If the difference between the read buffer position and the write buffer position exceeds the length of the buffer, then an event is generated. A response to the event may be to advance the read buffer position. Also, in another scenario, if a read buffer position advances forward to the corresponding write buffer position, then the read buffer position becomes the location of the write buffer position (i.e., the read buffer position does not advance beyond the write buffer position). For example, a client may fast forward a buffer television program up to the current write position.

Figure 5:
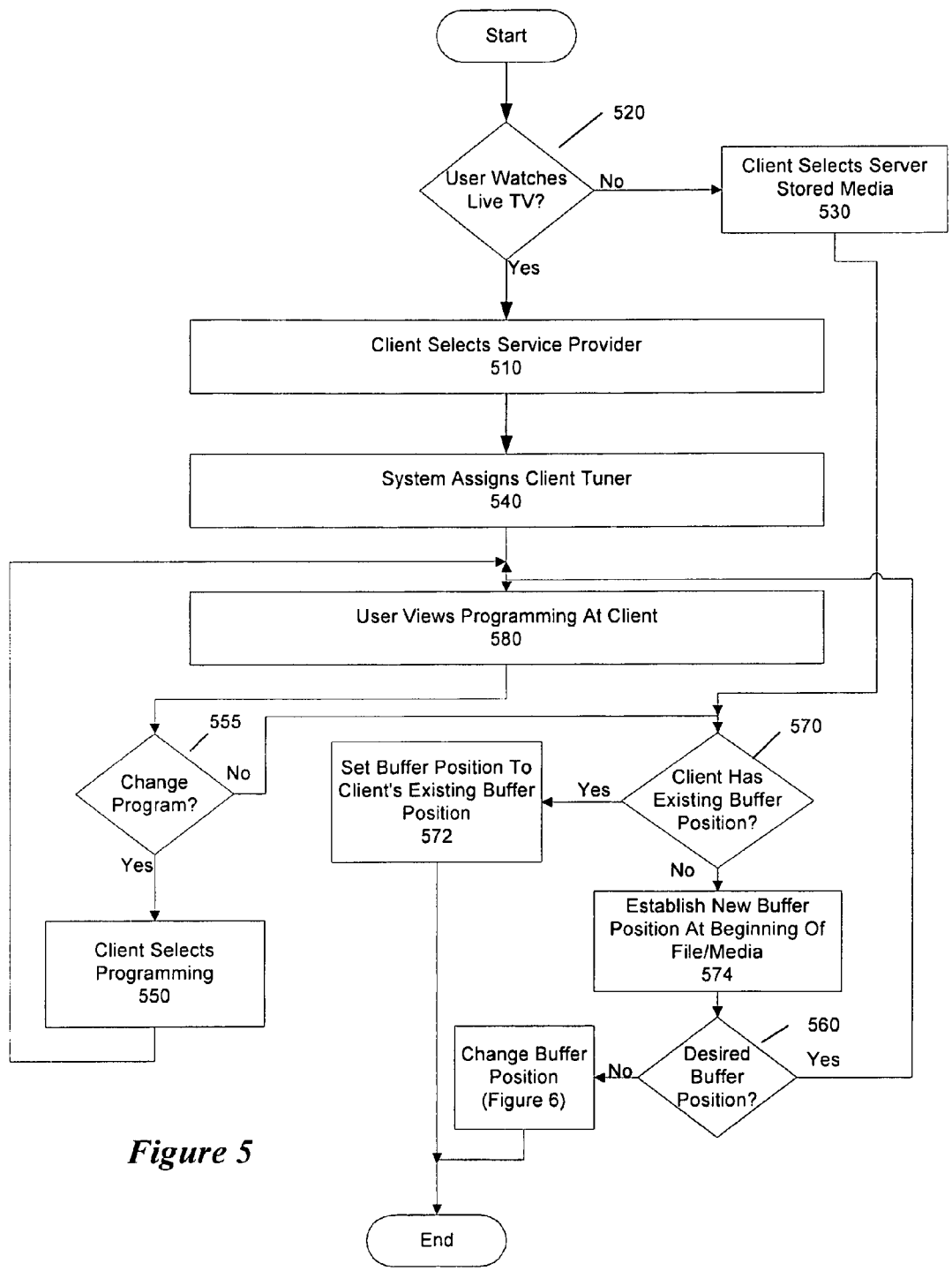
FIG. 5 is a flow diagram illustrating one embodiment for viewing video in the networked PVR system.

FIG. 5 is a flow diagram illustrating one embodiment for viewing video in the networked PVR system. Initially, the user receives a menu option, displayed on a client television, to watch live TV or to select media from a PVR-media server (block 520, FIG. 5). If the client does not elect to watch live television, then the client selects media stored on a PVR-media server (blocks 520 and 530, FIG. 5). Then, as discussed below, the client sets the buffer position through the system. If the user elects to watch live television, then the client selects a television service provider (block 510, FIG. 5). If there is only one television service provider available to the client, then the system eliminates the function of block 510. In one embodiment, the service provider selection may be configured during a set-up mode. For example, the television in the living room may be configured to always receive a television signal from a satellite system. The system selects a tuner for the client (block 540, FIG. 5). In one embodiment, the system automatically allocates, for the client television, an available tuner.

The user views the program at the client (block 580, FIG. 5). If the user desires to change the program, then the client selects programming from the electronic programming guide displayed at the client (blocks 555 and 550, FIG. 5). If the user does not desire to change the program, then the user potentially sets the buffer position. If the user has an existing buffer position and the user desires to set the program to an existing buffer position, then the user selects, through a menu, the existing buffer position (blocks 570 and 572, FIG. 5). If the client does not have an existing buffer position, then the system sets the buffer position to the start of the file/media (blocks 570 and 574, FIG. 5). The user may desire to change the buffer position to an existing buffer position (block 560 FIG. 5). If the user desires to set the program to an existing buffer position, the user, through the system, changes the buffer position. (block 565, See FIG. 6). For example, the user may select a program already in progress. Under this scenario, the user may wish to view the program from the beginning. To accomplish this, the user selects a new buffer position to start at the beginning of the program. The user then views the program at the client (block 580, FIG. 5).

In one embodiment, the PVR-media server acquires programming data, referred to as an electronic programming guide ("EPG"), from an EPG content provider. The EPG dataset provides a list of programs, including channels and times, available from the corresponding television service provider. Typically, the EPG data is provided on a service basis from the EPG content provider. The PVR-media server contacts the EPG content provider to acquire updated programming data. The PVR system utilizes the EPG data to schedule programs as well as to provide programming menus to the clients. Thus, for this embodiment, the PVR system scheduler is specific to an EPG data set. However, a home media networked system may include servers that utilize different EPG content providers, and consequently operate using different EPG data sets. For this embodiment, users only view channel selection menus based on the underlying EPG data sets. Thus, the menu presented at the client is dependent upon the underlying PVR-media server.

In one embodiment, the PVR system permits a client to select television programs without requiring the client to understand the notion of a television tuner. For example, two clients may be receiving a signal from the same tuner. Under this scenario, one of the clients may desire to change the channel to view a different program without affecting the ability of the other client to view the current program. The PVR system provides a menu that permits the user to select additional programming. In one embodiment, the programming menu is based on a specific television service provider and corresponding EPG content provider.

In one embodiment, the user selects programming within a television service provider—EPG content data set. A client may set-up the system to automatically select a preferred television service provider. If a user executes an operation that requires a new tuner, the user selects programming from the previously selected EPG content provider. After the user selects a new program, the system allocates a tuner to the user. Under this scenario, the user does not need to understand the notion of a tuner. Instead, the client only selects a program or cancels an event in order to acquire use of a tuner. If a tuner is not available for allocation to the user, then the system resolves conflict through predetermined "conflict management" procedures. One embodiment for resolving certain conflicts that arise in networked PVR systems is described more fully below.

Figure 6:
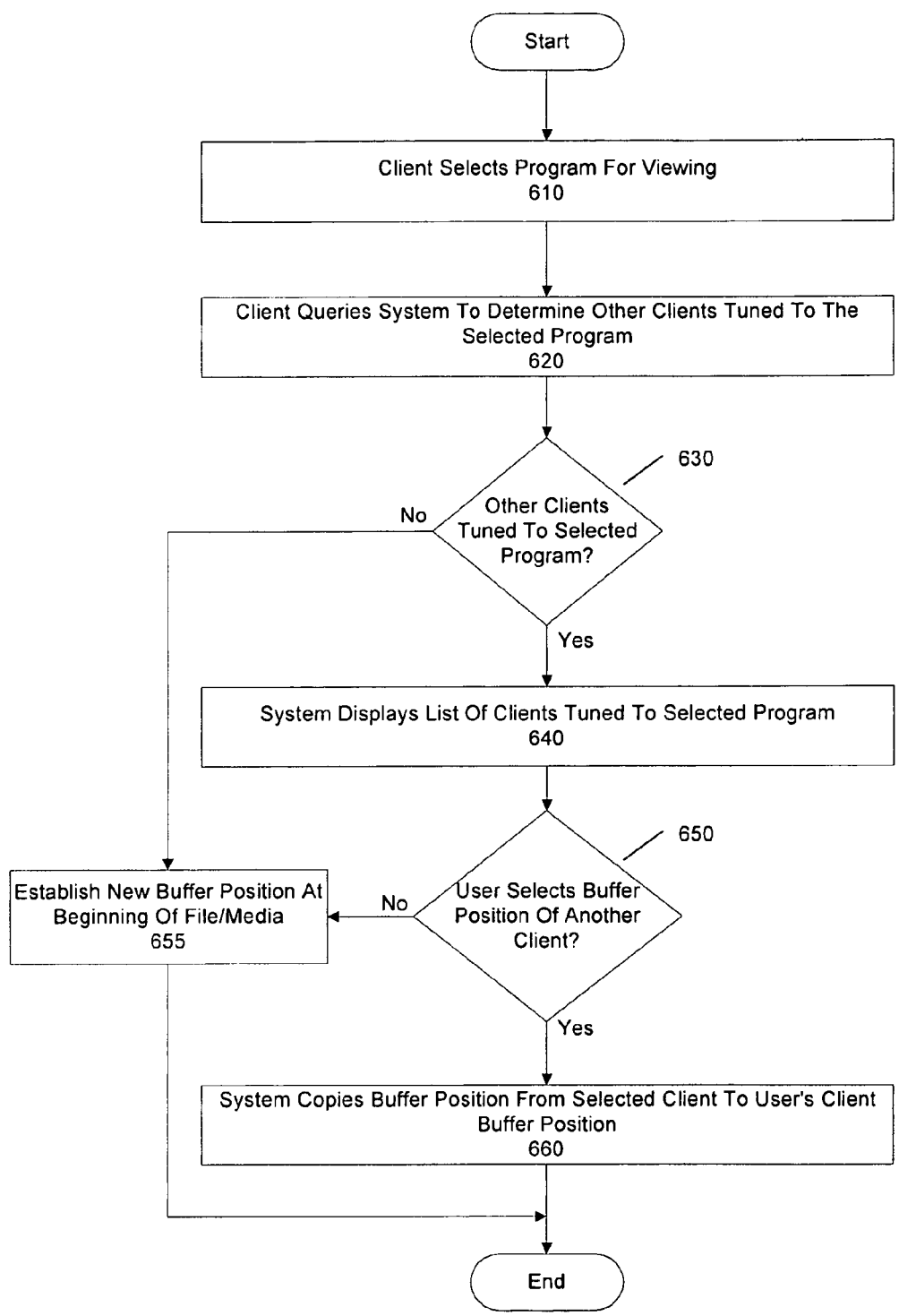
FIG. 6 is a flow diagram illustrating one embodiment for using the networked PVR system of the present invention.

The networked PVR system permits users to select buffer positions from different clients. For example, a user watching a program at a first client (e.g., television in living room) may go to another room and pickup that program from a second client (e.g., television in kitchen) where they left off watching on the first client. Under this scenario, the user may pause the program playing at the living room client for subsequent viewing at the kitchen client. FIG. 6 is a flow diagram illustrating one embodiment for using the networked PVR system of the present invention. For this scenario, the user selects, from a client, a program for viewing (block 610, FIG. 6). The user may then desire to select that program from a different client. To accomplish this, the user queries the PVR system to determine other clients tuned to be selected program (block 620, FIG. 6). If other clients are tuned to the selected program, then the system displays a list of clients tuned to the program (blocks 630 and 640, FIG. 6). For the above scenario, the user may query the PVR system from the client in the kitchen to pickup the program paused in the living room. In one embodiment, the user, from a client, pulls-up a menu item to determine "Who is watching the selected program?" In response, the PVR system displays a menu of client locations currently playing the selected program. For the above example, the PVR system displays the "living room client" to identify that the selected program is currently playing in the living room. Alternatively, if no other clients are tuned to the selected program, then the buffer position is set to the start of the program (blocks 630 and 655, FIG. 6).

If the user desires to select a buffer position of another client, then the PVR system copies a buffer position from the selected client for use as the buffer position for the user's client (blocks 650 and 660, FIG. 6). For the above example, the user, at the kitchen client, selects the buffer position of the living room client, so as to pickup the selected program at the position of the program was paused. Alternatively, the user may desire to view the selected program from the start of the program (blocks 650 and 655, FIG. 6). In one embodiment, the PVR system may synchronize two buffer positions for simultaneous playback at two clients. For example, a user may desire to playback a music video at two different clients so as to play the music over a broader area of the home.

In one embodiment, the PVR system assigns states to television tuners. For this embodiment, a television tuner includes one of the following states: busy, maybe free, and totally free. A busy state indicates that the server is currently recording a program using the tuner. The maybe free state indicates that a client may be viewing a program using the tuner. For example, a user may select to view a program at a client. Thereafter, the PVR system does not actually know whether the user is still viewing the program (e.g., as the user may have just turned off their monitor). Under this scenario, the tuner is designated as "maybe free." If the tuner is designated as "totally free", then the tuner was not allocated by the scheduler and a client was not viewing programming with the tuner. As described fully below, the tuners states are used to allocate tuners.

In one embodiment, the PVR system utilizes a scheduler. In general, the scheduler acts as a "to do list" for the system. For example, the scheduler executes a process to record programs selected by system users. The programs may be selected for recording on an individual basis, or the programs may be scheduled for recording based on a subscription. The scheduler resolves issues of conflict management in order to allocate resources to record programs.

In one embodiment, the PVR system supports "subscriptions." In general, with a subscription, the system records recurring broadcasts of a selected program. Using a subscription, a user need only select the program for subscription to record all occurrences of that program. In one embodiment, the scheduler of a PVR-media server identifies events to fulfill subscriptions. For example, a user may select a subscription to a television show, "Reality Television." The scheduler of a PVR-media server determines, from the EPG data set, all unique episodes of the television show, "Reality Television." The scheduler generates events, one event for each unique episode identified, to record the event. In one embodiment, a subscription is scheduled within a single PVR-media server. However, in other embodiments, subscriptions may be pushed to other PVR-media servers. For example, the scheduler of a first PVR-media server may include events pertaining to a subscription. If the first PVR-media server has conflicts with one or more events of the subscription, then an event of the entire subscription may be assigned to a second PVR-media server. If this occurs, the scheduler of the second PVR-media server fulfills the subscription (e.g., in the same manner as the scheduler for the first PVR-media server). For example, events from the scheduler of the first PVR-media server may be transferred to the scheduler of the second PVR-media server. In addition, the scheduler of the second PVR-media server may assume the task of scheduling future events for the subscription. Also, subscriptions may be pushed between PVR-media servers if a PVR-media server is removed from the network.

Figure 7:
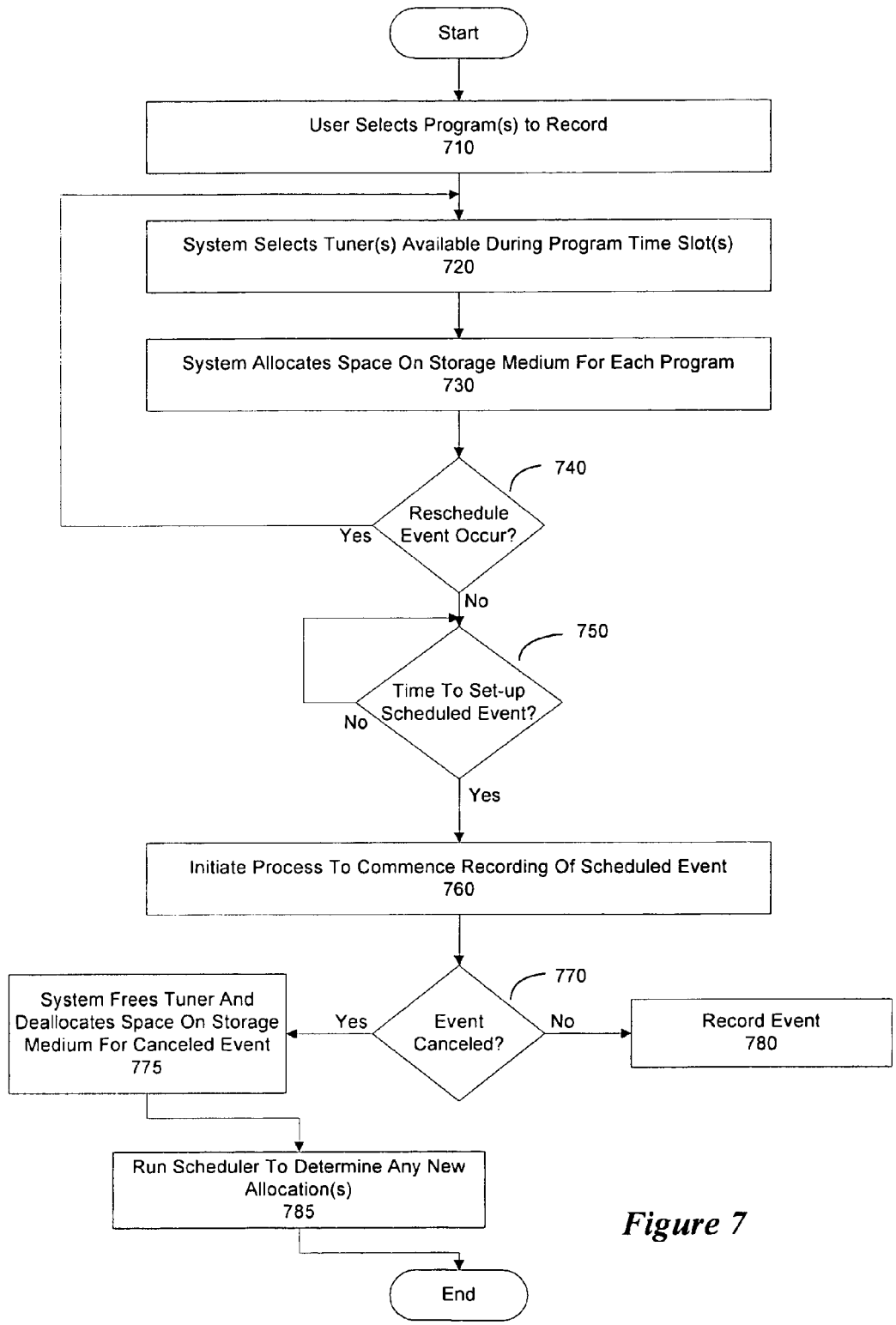
FIG. 7 is a flow diagram illustrating one embodiment for scheduling events in the networked PVR system of the present invention.

FIG. 7 is a flow diagram illustrating one embodiment for scheduling events in the networked PVR system of the present invention. First, a user selects, through a menu, programs to record, either individually or through a subscription (block 710, FIG. 7). In response, the system selects a tuner available during the time slot of the event (block 720, FIG. 7). In addition, the system allocates storage space on the storage medium for the scheduled program (block 730, FIG. 7). If a "re-schedule" of event occurs in the system, the process is repeated to both allocate available tuners and available storage space (blocks 740, 720 and 730, FIG. 7). In one embodiment, a "re-schedule" event occurs when the electronic programming guide data is downloaded to a PVR-media server. A re-schedule event also occurs when a user deletes an item from the scheduler. For example, a user may delete an event to record a program that previously canceled another program from a prior subscription. Under this scenario, the system reschedules the prior subscription because the user canceled the conflicting program.

When the time to set-up the scheduled event has arrived (e.g., a time prior to the time of the scheduled event), the system initiates the process to commence recording of the scheduled event (blocks 750 and 760, FIG. 7). One embodiment for recording a scheduled event, including resolving conflicts of tuner resources, is described fully below in conjunction with a description of FIG. 8. If the event is canceled, then the system frees a tuner and de-allocates space on the storage medium for the cancelled event (blocks 770 and 775, FIG. 7). Also, the scheduler is run to determine any new allocations to fill the slot (block 785, FIG. 7). In one embodiment, the system also permits the user to re-schedule, instead of cancel, the event. Alternatively, if the event is not canceled, then the scheduled event is recorded (blocks 770 and 780, FIG. 7).

In one embodiment, the PVR system assigns equal ownership to all clients using a tuner. For example, three clients may be utilizing the same tuner (i.e., all three clients are viewing the same program although potentially at different portions of the program). If one client changes the channel of the tuner, then the tuner is set to the new the channel, and consequently all three clients are tuned to the new program.

The PVR system resolves several conflicts that may occur in a networked PVR system (i.e., referred to as "conflict management"). Some conflicts that arise in a networked PVR system include: inadequate storage space to record new programs; an insufficient number of tuners to record scheduled programming; inconsistent input, including requests to change the channel when recording a scheduled event; and an insufficient number of tuners to record events.

In one embodiment, if a PVR-media server has insufficient storage space to record a scheduled event, then the system automatically deletes content prior to recording. One embodiment to assign priority for content deletion is described more fully below.

Figure 8:
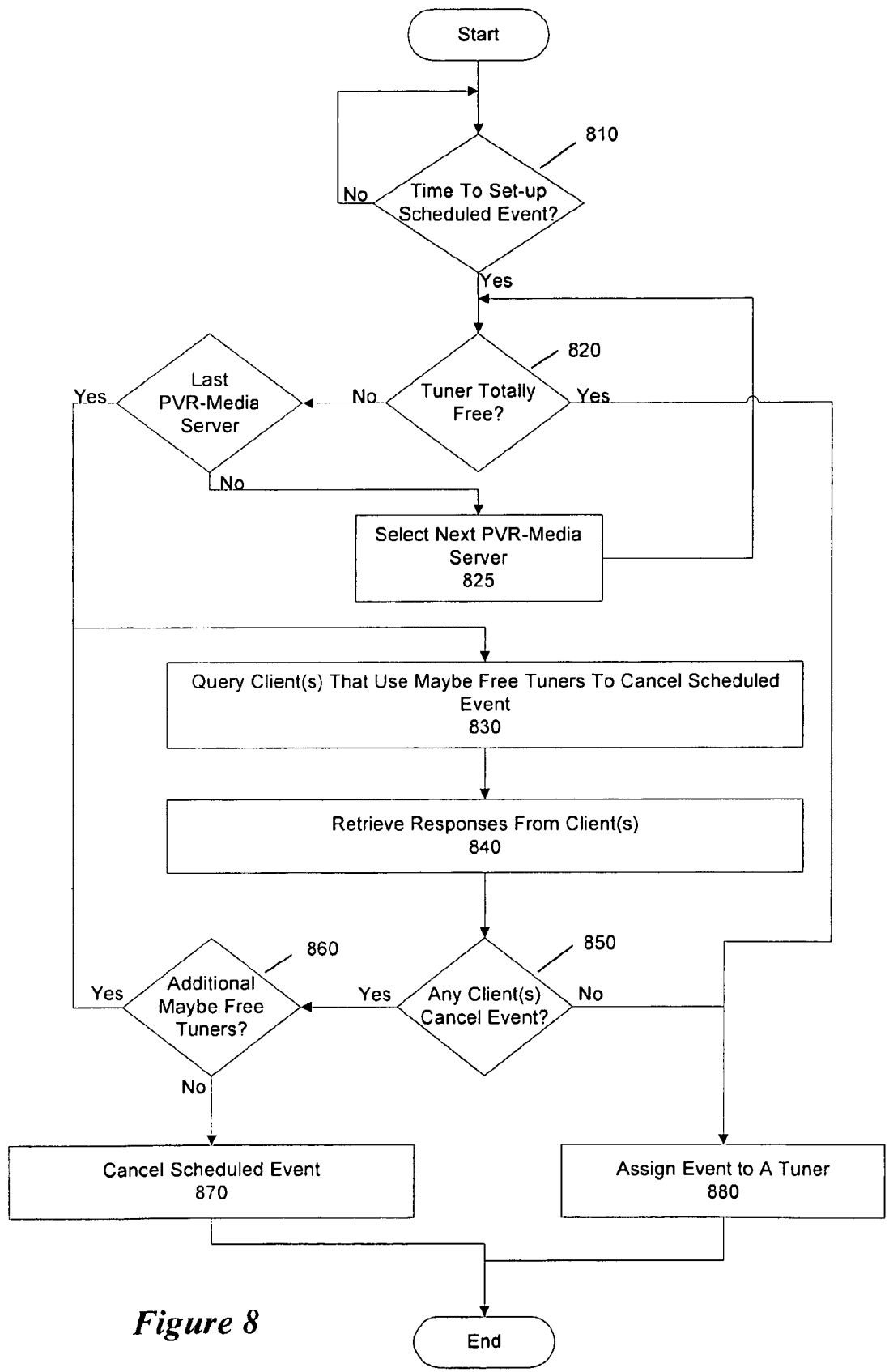
FIG. 8 is a flow diagram illustrating one embodiment for recording programs.

FIG. 8 is a flow diagram illustrating one embodiment for recording programs. Just prior to the time of a scheduled event, the PVR system determines whether a tuner is available (blocks 810 and 820, FIG. 8). If a tuner is available (i.e., the tuner is designated as "totally free"), then the tuner is assigned to record the program (blocks 820 and 880, FIG. 8). If no tuners are designated "totally free" on the PVR-media server, then the system determines whether there are any other PVR-media servers with tuners (block 822, FIG. 8). If so, another PVR-media server is selected, and the system determines whether the selected PVR-media server has an available tuner (blocks 825 and 820, FIG. 8). This process is repeated for all PVR-media servers on the network.

If a tuner is not available (i.e., all tuners on the network are designated as either "busy" or "maybe free"), then the system queries the clients allocated or potentially allocated to the tuners to determine whether the clients desire to cancel the scheduled event (block 830, FIG. 8). For example, in one embodiment, to query the clients, the PVR system displays a menu screen on each client asking whether the system should proceed with the scheduled event. All clients allocated to the tuner receive the inquiry. For example, the screen display may ask "System needs to change the channel to record program X at time Y, is this OK?" If all of the client responses are yes to the inquiry, then the system proceeds to record the scheduled event. If a client does not answer the inquiry in a predetermined amount of time, then the system also proceeds to record the scheduled event.

The PVR system retrieves the responses from the clients (block 840, FIG. 8). If any one of the clients cancels the event, then the system determines whether there are additional PVR-media servers with tuners to allocate to record the scheduled event (blocks 850 and 860, FIG. 8). If there are no more additional PVR-media servers, then the scheduled event is canceled (blocks 860 and 870, FIG. 8). Alternatively, if there are additional PVR-media servers in the system, then the process is repeated to allocate available tuners (blocks 860, 820, 830, 840, and 850, FIG. 8). This process to assign tuners is repeated for all PVR-media servers in the system.

The process of FIG. 8 may be used to allocate tuners for multiple events scheduled at the same time. For example, three programs may be scheduled for recording at an instance in time. The process is repeated for each of the programs. For example, if a client cancels the first scheduled program, then that program is pushed to, if available, another PVR-media server in the system. Then, all the relevant clients receive another inquiry with regard to the scheduling of the second program. Again, if anyone of the clients cancel the second program, the scheduling of the second program is potentially shifted to another PVR-media server.

In one embodiment, the PVR networked system has the ability for the user to "lock a tuner." For example, if a user is watching a TV show that spans several hours (e.g. baseball game, academy awards, etc.), then the user may not want to receive multiple requests to change the channel to a previously scheduled event. In one embodiment, the user may select an option in the system to bypass the inquiry to change the channel. When enabled, the system does not display the inquiry to re-allocate the tuner to resolve tuner resource conflicts during the user's program.

In one embodiment, the networked PVR system includes advanced conflict management. In general, advanced conflict management aids the user to resolve conflicts using means other then querying the user to cancel scheduled events. For example, an advanced conflict manager may automatically seek out alternate presentations of identical television episodes, and present to the user an option for the system to record the program when a conflict does not arise. Thus, if a user attempts to record two shows simultaneously, the system may return a message stating that "The episode of "Your Favorite Show", set to record at 9 pm on channel 4, is now set to record at 11 pm on channel 7."

A user may attempt to change a channel on a tuner currently recording a scheduled event. Under this scenario, the system prompts the user to cancel the scheduled event. Also, a user may attempt to record a program when there are no more available tuners in the system. Under this scenario, the user receives a list, from the entire network, of events to cancel. For example, a system may have three tuners. A first tuner may be recording a first scheduled event, a second tuner may be recording a second scheduled event, and a third tuner may be allocated for use by at least one client. If the user attempts to record another program, the system displays the three programs currently allocated to the three tuners. In response, if the user still wants to record the new program, the user cancels one of the events displayed.

In one embodiment, the PVR system includes a "deletion manager." In general, a deletion manager determines the priority to delete content stored in the PVR-media servers. In one embodiment, the deletion manager utilizes a date based deletion system. Under a date based deletion system, the first recorded program is also the first program scheduled for deletion. After a predetermined amount of time, an item is tagged on a menu to inform the user that the program may be deleted. Additional icons may be used to inform the user concerning potential deletion of programs. For example, another icon may be used to inform the user that the item may be deleted, and a different icon may be used to inform the user that the program will not be deleted.

In one embodiment, the deletion manager uses a priority system based on "sooner" or "later" flags. Under this system, the user marks content for deletion "sooner" or "later." The deletion manager analyzes content to delete items marked "sooner" before items marked "later." This system may be used in conjunction with the date based deletion system described above. In another embodiment, the user ranks content for a priority of deletion in accordance with a range (e.g., 1-5).

Client Device Aggregation:

The networked PVR system utilizes a "peer-to-peer" architecture. All client devices on the media platform have the ability to communicate with other devices, including multiple client devices and multiple PVR-media servers. This architecture permits a device to obtain all media, including television signals, available on the network and to aggregate the media for presentation on that device.

A device, including a client device or a server device, may enter and/or exit the home network, at any time, and still maintain full functionality. Thus, when a device is powered off, other devices automatically recognize that the device is no longer available on the home network. When a new device is added or a portable device comes onto the network, the other nodes automatically recognize the new devices. The other nodes may utilize the services on the added device. A new PVR-media server may also automatically recognize new devices, as long as at least one other PVR-media server is currently on the network.

Figure 9:
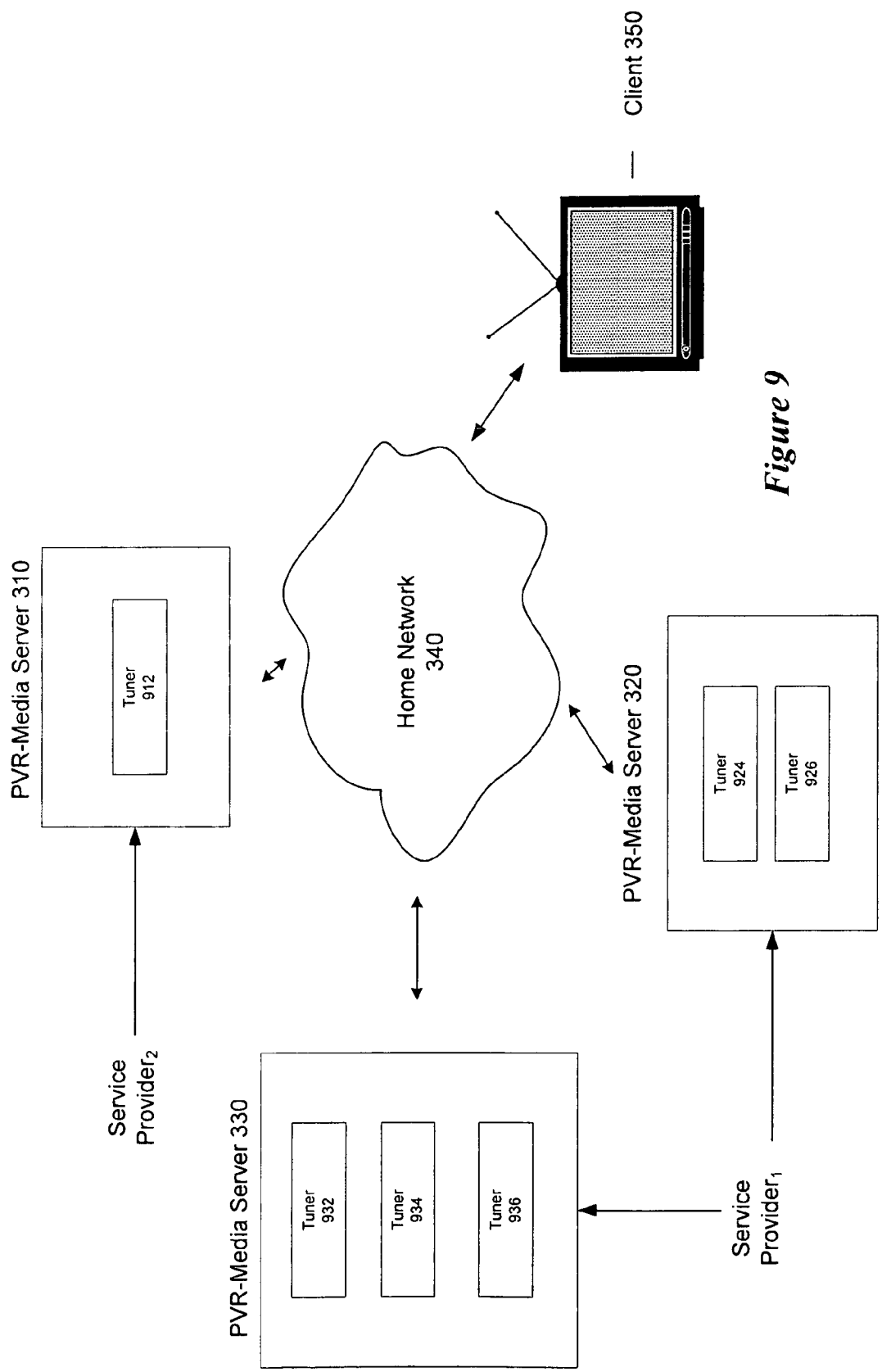
FIG. 9 illustrates client device aggregation of media in accordance with one embodiment of the present invention.

FIG. 9 illustrates client device aggregation of television signals in accordance with one embodiment of the present invention. For this example, three PVR-media servers (910, 920, and 930) are coupled to home network 940. As shown in FIG. 9, each PVR-media server has at least one tuner. For example, PVR-media server 930 has three tuners (932, 934 and 936). In addition, the PVR-media servers may store various media items (e.g., video, audio, photos, etc). Also, for this example, client device 950 resides on the home media network 940. Client device 950 may comprise a television.

After completing a discovery process, client device 950 determines programming available on home network 940. Thus, client device 950 aggregates programming from all tuners for use at client device 950. As shown in FIG. 9, client device 950 aggregates all programming available through PVR-media servers 910, 920 and 930.

The networked PVR system provides the capability to identify all programming as unique. For example, all programming classified under the genre "comedy" is recognized as such, and the system displays them accordingly. Two or more actors may have the same name. The networked PVR system utilizes a distributed database that allows the system to distinguish among unique programs. Thus, if a program is offered over two different television service providers, then during client device aggregation, the client device recognizes only a single program. For the example of FIG. 9, the movie, "Greatest American Movie", is offered through both PVR-media server 920 and PVR-media server 910. During client programming aggregation, client device 950 recognizes the movie, "Greatest American Movie", offered through both PVR-media servers 910 and 920, as the same program. Thus, client device 350 only recognizes the movie, "Greatest American Movie", as a single program.

The underlying protocols alone do not permit a client device to aggregate programming from devices on the home network. The protocols themselves have no requirement to support a distributed system. For this embodiment of the networked PVR system, aggregation logic creates a distributed system using non-distributed protocols. The aggregation logic uses multiple protocols to integrate devices on the home network.

Figure 10:
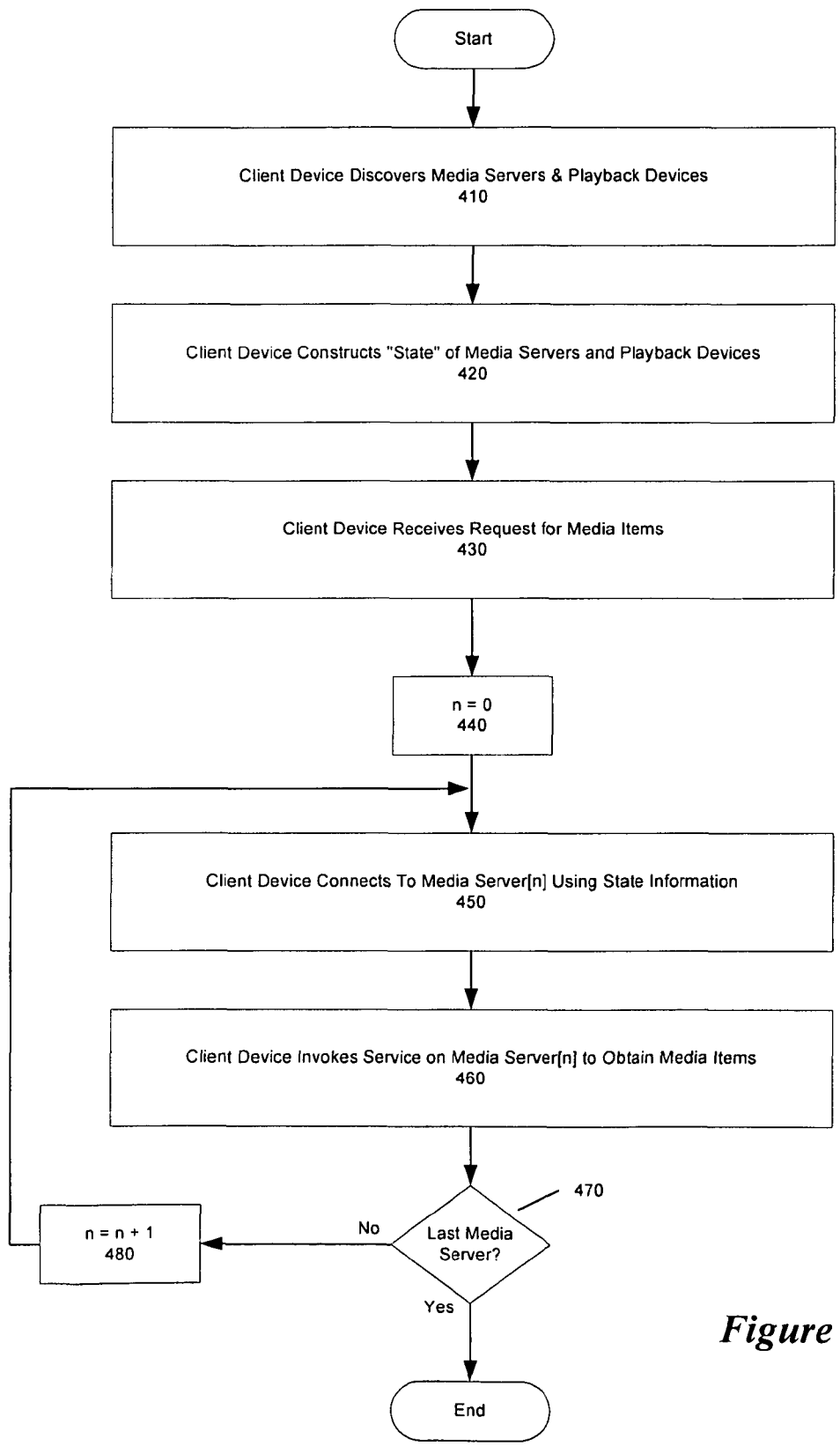
FIG. 10 is a flow diagram illustrating one embodiment for client media aggregation over a network.

FIG. 10 is a flow diagram illustrating one embodiment for client aggregation of programs over a network. Initially, a client device discovers devices (e.g., PVR-media servers) on the home network (block 1010, FIG. 10). One embodiment for discovering devices on the home network is described more fully below. Based on information learned in the discovery process, the client device constructs state information for the discovered devices (block 420, FIG. 10). The client device receives a request for media items (block 430, FIG. 10). The aggregation logic receives requests from software components operating above the aggregation logic. For example, the client device may comprise a television operating a user interface. A user may request, using a remote control device, a list of all television programs, either live or pre-recorded, available on the home network. For this example, application logic on the user interface translates the request for programs, and forwards the request to the aggregation logic.

The aggregation logic for the client device acquires programming information from all PVR-media servers that provide the selected programs. For example, if the client requests television programs from a specific genre (e.g., comedy), then the client device acquires all programs classified in that genre available from all PVR-media servers. This operation is illustrated in FIG. 10 (blocks 1040, 1050, 1060, 1070 and 1080). Specifically, an identifier (i.e., n=0) to select a specific PVR-media server is set (block 440, FIG. 10). The client device connects to a selected PVR-media server (e.g., PVR-media server[0]) using state information acquired during the discovery process (block 1050, FIG. 10). Specifically, the client device translates the request for programming to a protocol supported by the selected PVR-media server, and forwards the request to the PVR-media server. In one embodiment, the client device invokes a service on the selected PVR-media server to obtain the programming (block 1060, FIG. 10). In one embodiment, the client device invokes a content manager service on the PVR-media server to acquire a list of programs available. If there are more PVR-media servers available on the home network, the client device identifies a new PVR-media server to acquire programming (blocks 1070 and 1080, FIG. 10). When the client device has acquired a list of programming from all the available PVR-media servers, the process is complete.

Figure 11:
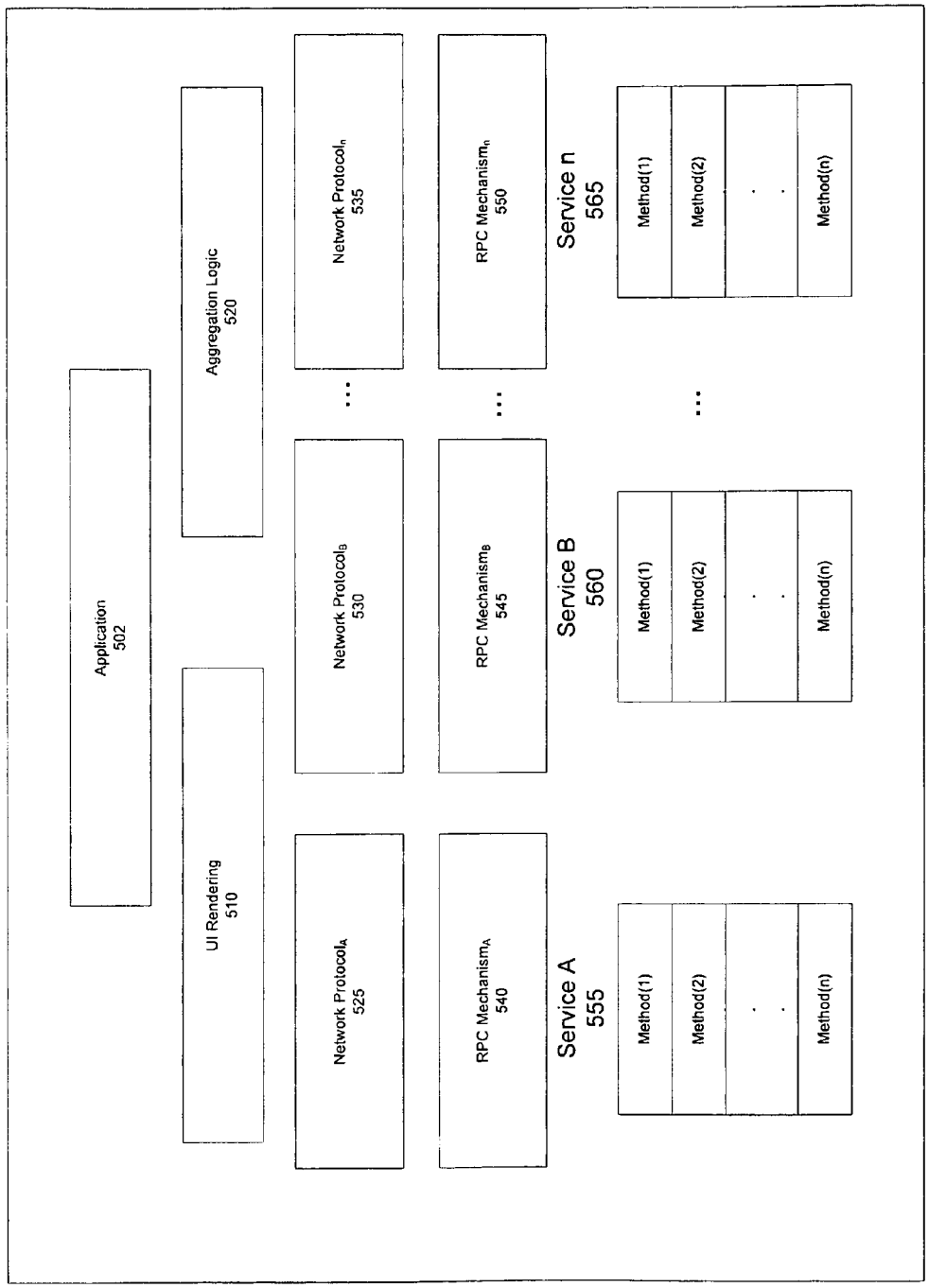
FIG. 11 is a block diagram illustrating one embodiment for software components operating on a networked PVR system device.

FIG. 11 is a block diagram illustrating one embodiment for software components operating on a networked PVR system device. Software components 500 include, at the highest level, application software 502. The application software 502 implements functionality for an underlying device. For example, application software 502 may implement functions for a DVD player. As shown in FIG. 11, underneath the application software 502 is aggregation logic 520. As discussed above, aggregation logic 520 permits a client device to aggregate media items and television programming on the home network.

The software components 500 also include user interface ("UI") rendering logic 510. UI rendering component 510 translates scene information to display information suitable for display on the client device. The UI rendering component 510 also renders the display data. For example, if the underlying client device includes a television display (e.g., CRT), then UI rendering engine 510 generates graphics data from scene information, and renders the graphics data on the television display.

As shown in FIG. 11, the client device incorporates one or more network protocols and remote procedure calls ("RPC") mechanisms. For example, FIG. 11 shows that the client device supports network protocol$_A$ (1125), network protocol$_B$ (1130), and network protocol$_n$ (1135). For this example, client device software 500 supports RPC mechanism$_A$ (1140), RPC mechanism$_B$ (1145), and RPC mechanism$_n$ (1150).

The client device software 500 supports one or more services. As shown in FIG. 11, one or more methods of a service are accessible through an interface. In general, the methods, when invoked, provide specific functionality for the underlying service. For this example, client device software 500 includes service$_A$ (555), service$_B$ (560), and service$_n$ (565). Each service is associated with one or more methods (i.e., method(1)-method(n)).

In one embodiment, the networked PVR system supports a plurality of underlying protocols. In general, the protocols define commands, RPC mechanisms, and interfaces to services. In one embodiment, the networked PVR system supports an industry defined UPnP protocol. In general, the UPnP protocol defines discovery over IP networks, an RPC mechanism, and interfaces for activating services. UPnP services include: a content directory service, a connection manager service, an audio/video ("A/V") transport service and an A/V control service.

In one embodiment, the networked PVR system also supports a proprietary protocol (i.e., non-industry standard protocol). For this embodiment, the proprietary protocol defines a network discovery process, an RPC mechanism, and an interface to services. The services include a content manager, a media player service, and a PVR control interface. The content manager service allows a client device to interface to a database. Specifically, using the content manager service, the client device may extract information (e.g., URL to identify media, metadata, etc.) from a database on another network device. Thus, the content manager service provides a means for a device of the networked PVR system to query a database. The media player service defines an interface to permit playback functionality (e.g., initiate and control media streams). The PVR control interface enables streaming media on a non-stored object. In addition, the PVR control interface permits a user to record current programming as well as schedule recording of future programming.

In one embodiment, the discovery process on the proprietary protocol implements asynchronous based messaging. The discovery protocol operates on any network that supports packet based messaging or on a serialized network. In one embodiment, the discovery protocol includes an "announce" command, a "discovery" command, and a "bye-bye" command. The announce command is used by a device to announce its presence on the home media network. A discovery command is a request for an announcement (i.e., queries whether any client devices are on the home network). The "bye-bye" command is used by a client device to announce that the client device is leaving the network. In one embodiment, there are two types of announcements and two types of "bye-bye" commands: one for devices and one for services.

In one embodiment, the RPC mechanism, supported by the proprietary protocol, uses a packet-based protocol. The services include methods and an identification number to permit a device on the home network to construct RPC based packets with the appropriate arguments. In general, an RPC mechanism permits a device to control another device on the network. The protocol is effectuated through requests and responses. The RPC packets include a header. In one embodiment, the header contains: version information, a command class (maps to a particular service), the command (the method the device is requesting or the response coming from the method), an identification (identification of requests or identification of responses corresponding to a request), and a length. After the header, the RPC protocol format specifies data (i.e., arguments for requests and returns values for responses).

Figure 12:
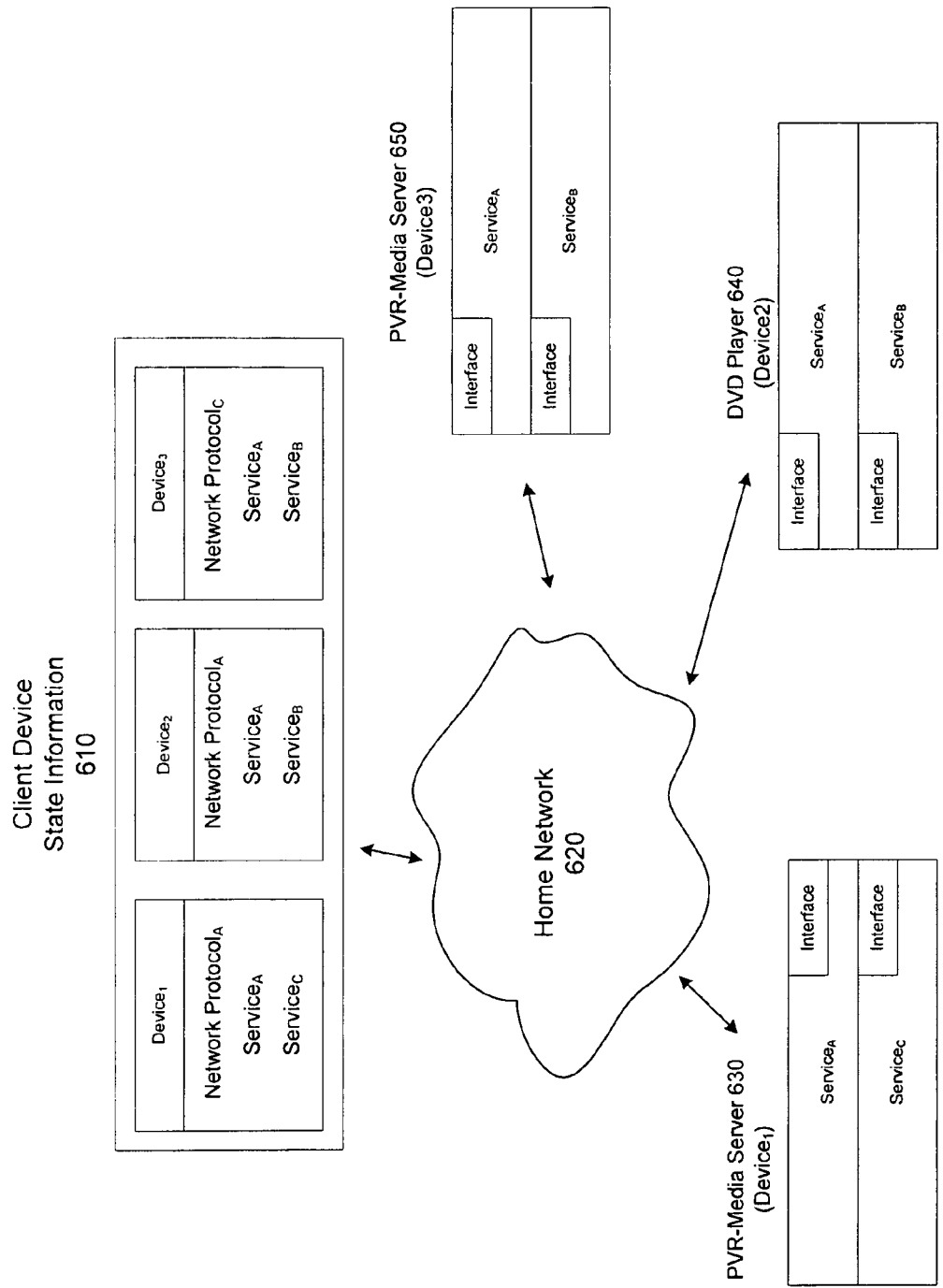
FIG. 12 is a block diagram illustrating an example home network for the networked PVR system.

FIG. 12 is a block diagram illustrating an example home network for the networked PVR system. For this example, a home network includes PVR-media server 1250, DVD player 1240, and PVR-media server 1230. A client device (1210), which includes a television, enters the home network 620, and discovers, using a supporting protocol, three devices (e.g., PVR-media server 1250, DVD player 1240, and PVR-media server 1230). As shown in FIG. 12, client device 1210 stores state information for each of the devices discovered on home network 1220. Specifically, client device 1210 stores, for device$_1$ (PVR-media server 1230) a supporting network protocol (i.e., network protocol$_A$) as well as a list of services supported by the devices (i.e., service$_A$ and service$_C$). The network protocol also specifies an RPC mechanism to execute remote procedure calls on PVR-media server 1230. Similarly, state information for device$_2$ (i.e., DVD player 1240) indicates that device$_2$ supports network protocol$_A$ and implements service$_A$ and service$_B$. Device$_3$, PVR-media server 1250, supports network protocol$_C$, and implements service$_A$ and service$_B$.

As shown in FIG. 12, each service (e.g., service$_A$, service$_B$, and service$_C$) supports an interface. The interface defines a specification to provide a means to access the methods or commands within a service. As such, the client device 1210 utilizes services (service$_A$ or service$_B$) on PVR-media server 1250 through their respective interfaces. Note that PVR-media server 1230, DVD player 1240 and PVR-server 1250 all implement service$_A$. Each interface for service$_A$ is the same to permit uniform accessibility to the service. However, the implementation of service$_A$ in each of the devices may be different.

In one embodiment, a networked PVR system implementation provides security. For this embodiment, the announcement command is open ended, such that the protocol only defines a minimum specification for communication. Thus, announcement protocols may support multiple network specifications, including TCP and secure sockets layer ("SSL"). The protocol supports implementation on TCP/IP networks. In addition, the protocol supports SSL operating on TCP/IP networks. SSL permits secure communications, including authentication, between two parties on a network.

The proprietary protocol also permits an implementation using partial security. For this embodiment, a service may include some methods that require secure communications and other methods that do not require secure communications. Thus, some methods utilize SSL technology to realize secure communications between two devices on the home network.

Figure 13:
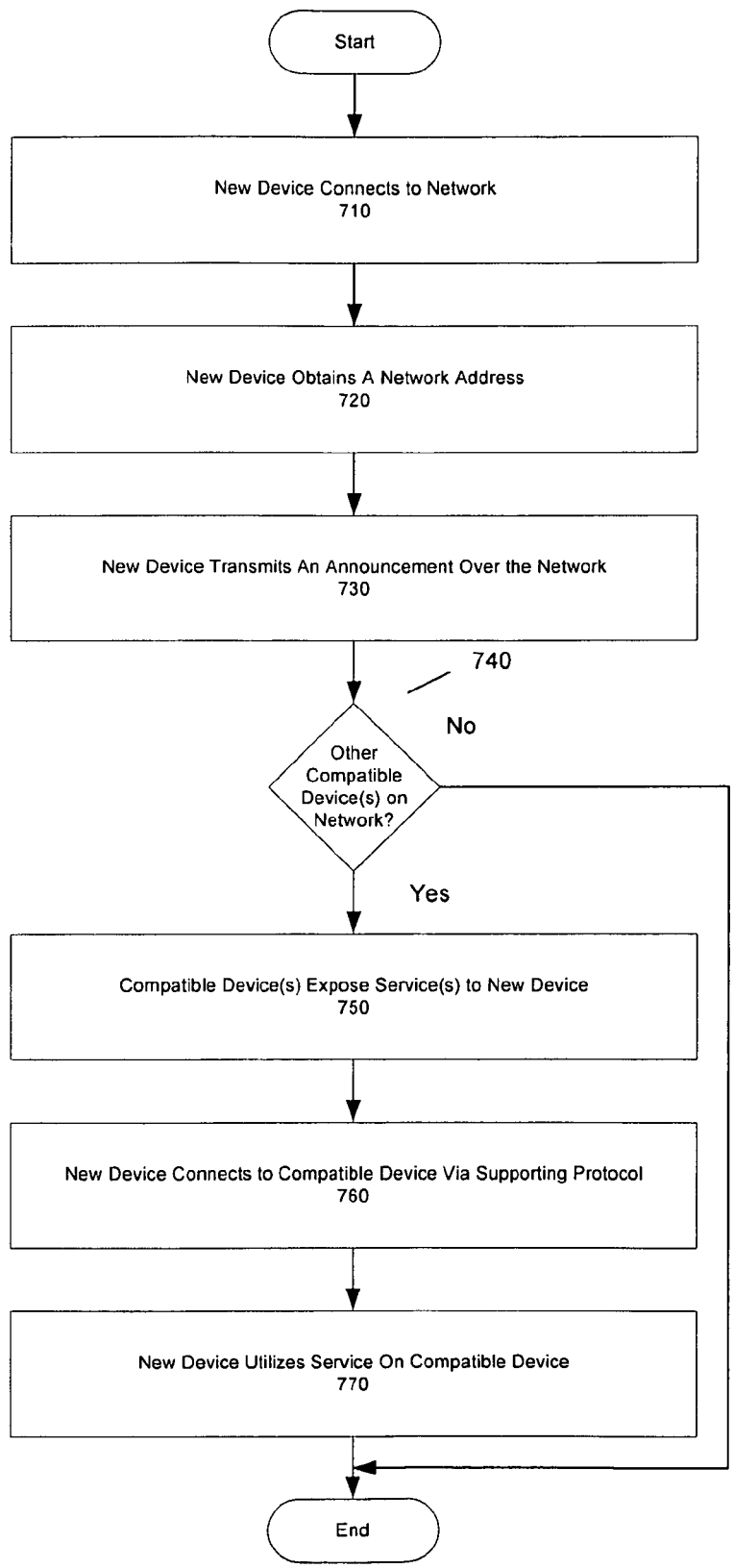
FIG. 13 is a flow diagram illustrating one embodiment for discovering devices in the networked PVR system.

Discovery:

FIG. 13 is a flow diagram illustrating one embodiment for discovering devices in the networked PVR system. A new device (i.e., a device not currently connected to the network) is connected to the home media network (block 1310, FIG. 13). In order to communicate on the network, the new device obtains a network address (block 1320, FIG. 13). For example, in an IP network, the client requires an IP address. If the underlying network supports TCP/IP, then the client device determines if there is a DHCP server. If so, the DHCP server assigns the IP address to the new device. If not (i.e., the DHCP server is not available to assign the new device an IP address), then the new device selects an IP address from a pool and determines whether any other device on the home network has that IP address. If no other device on the network has that IP address, then the client device uses this IP address. This process of auto IP addressing allows communication on a home network within a single subnet.

The new device transmits an "announcement" command over the network (block 1330, FIG. 13). The format of the announcement command complies with a protocol supported by the devices. The new device may broadcast or multicast the announcement command over the network. For example, in an IP network, the new device may multicast the announcement in order to expand subnets if the home network includes a gateway. A multicast format is used to specify specific IP addresses (e.g., transmitting an announcement only to those devices on the network interested or compatible with the new device). As used herein, compatible devices are those devices that may be interested in communicating with the client device.

In response to the new device's announcement command, the new device constructs state information. In general, the state information provides details regarding devices available on the network. The state information includes protocols and services supported by those devices. When compatible devices on the network receive the announcement command, those compatible devices may add information, encapsulated in the announcement command, to a local cache.

If there are no compatible devices on the network or the new device does not desire to utilize a service on the network, then the process terminates. For example, if the new device is a television, then compatible devices include those PVR-media servers storing video (e.g., DVD, MPEG, etc.) as well as providing live or pre-recorded television. If there are other compatible devices on the network, those devices expose one or more services to the new device (block 1350, FIG. 13). To discovery services on the network, the new device transmits a discovery command and waits for a response. For this example, a PVR-media server, which provides live television, exposes an interface to allow the new device to aggregate programming provided by the PVR-media server (e.g., programming provided by a television service provider).

In response to the request (e.g., new device application logic), the new device connects to a compatible device via a supporting protocol (block 760, FIG. 13). Specifically, the device translates the protocol for the appropriate device using the state information. For example, if the compatible device supports an industry standard protocol, then the new device selects the industry standard protocol to communicate to that device. The new device utilizes the services on the compatible device (block 1370, FIG. 13).

A PVR-media server entering a home network is one example of the discovery process. For this example, the PVR-media server, after obtaining a network address, transmits an announcement command over the network. The PVR-media server announces the services it supports (e.g., content manager, media player service and PVR control interface), and exposes interfaces to network clients to permit access to those services. If a device enters the network, the device waits for an announcement from the server. When the client identifies the PVR-media server, the client connects to the PVR-media server via a protocol the server specified in the announcement command. This process allows the client device to navigate media and programming on the PVR-media server. Using the supporting protocol, the client device connects to a playback device (e.g., television), either itself or another playback device, and instructs the playback device to play the program that a user selected from programming available on the PVR-media server.

Networked PVR Data Model:

The networked PVR system operates in conjunction with a data model. The format and arrangement of underlying database is not defined by the networked PVR system. In the data model, objects (e.g., media items) have unique identifications in the database. The objects also have an associated "type" (e.g., channels, time slots, episodes, and shows). The data model defines relationships to define structure and hierarchy among objects and types.

Figure 14:
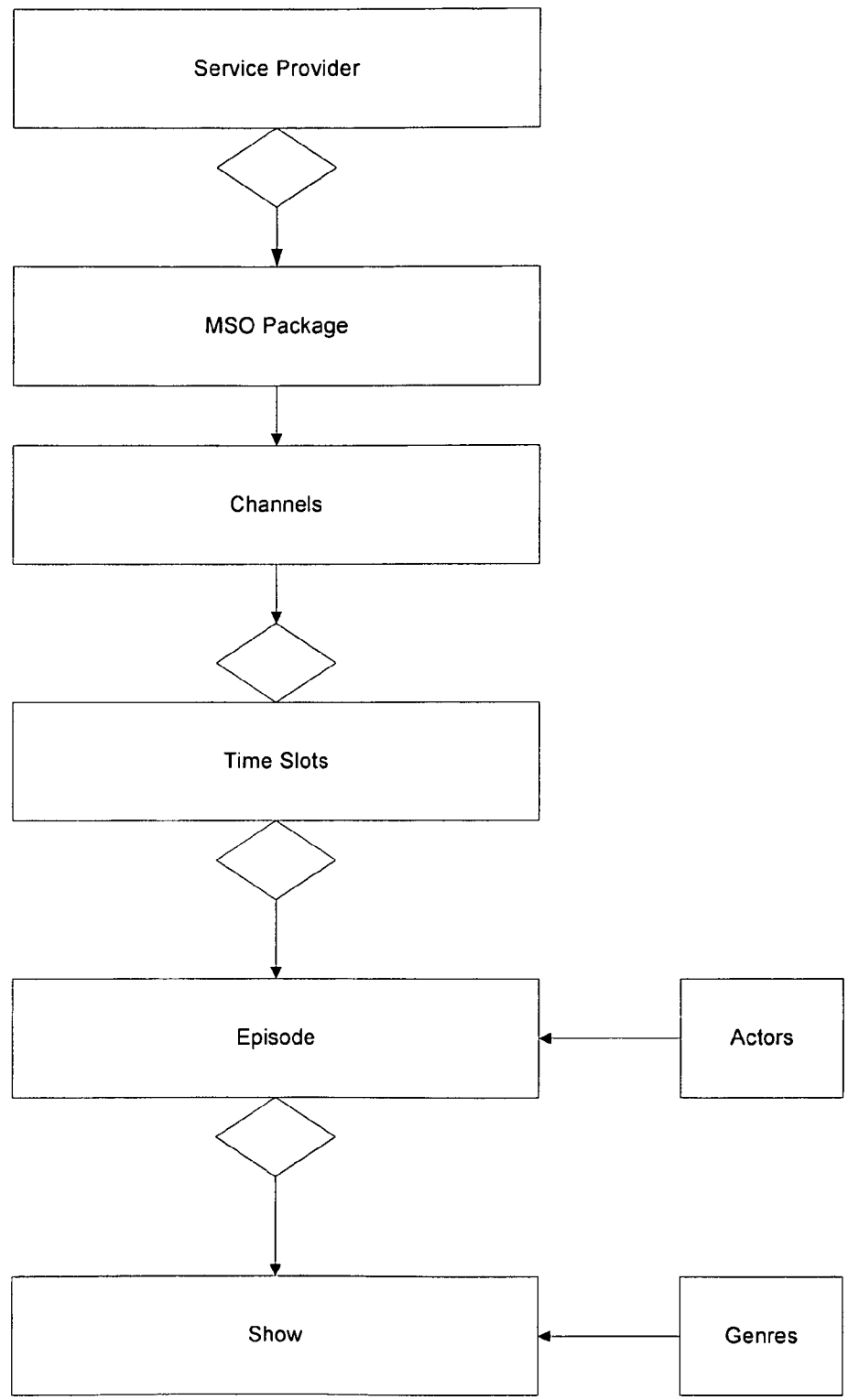
FIG. 14 is a block diagram illustrating one embodiment for a data model for elements of a networked PVR system.

FIG. 14 is a block diagram illustrating one embodiment for a data model for elements of a networked PVR system. For this embodiment, many service providers are mapped to a single MSO package. In general, the MSO package defines data (e.g., time, channel, content, etc.) for television programming. Data is extracted to map the MSO package to channels. The channels data object defines all channels available. As shown in FIG. 14, each channel maps to multiple time slots. An episode data object is mapped to one or more time slots. The episode data object identifies each individual episode of a program. In turn, the episode data object maps to one or more episodes to a show. An actors data object is mapped to each episode to identify actors. Also, a genres data object is used to classify shows in genres (e.g., comedy, drama, action, sports, etc.).

In one embodiment, the database for the networked PVR system comprises a relational database (e.g., key value pair database or standard query language ("SQL") database). For this embodiment, the database maps objects for storage in the relational database. Although one embodiment of the networked PVR system utilizes a relational database, other databases may be used without deviating from the spirit or scope of the invention.

Figure 15:
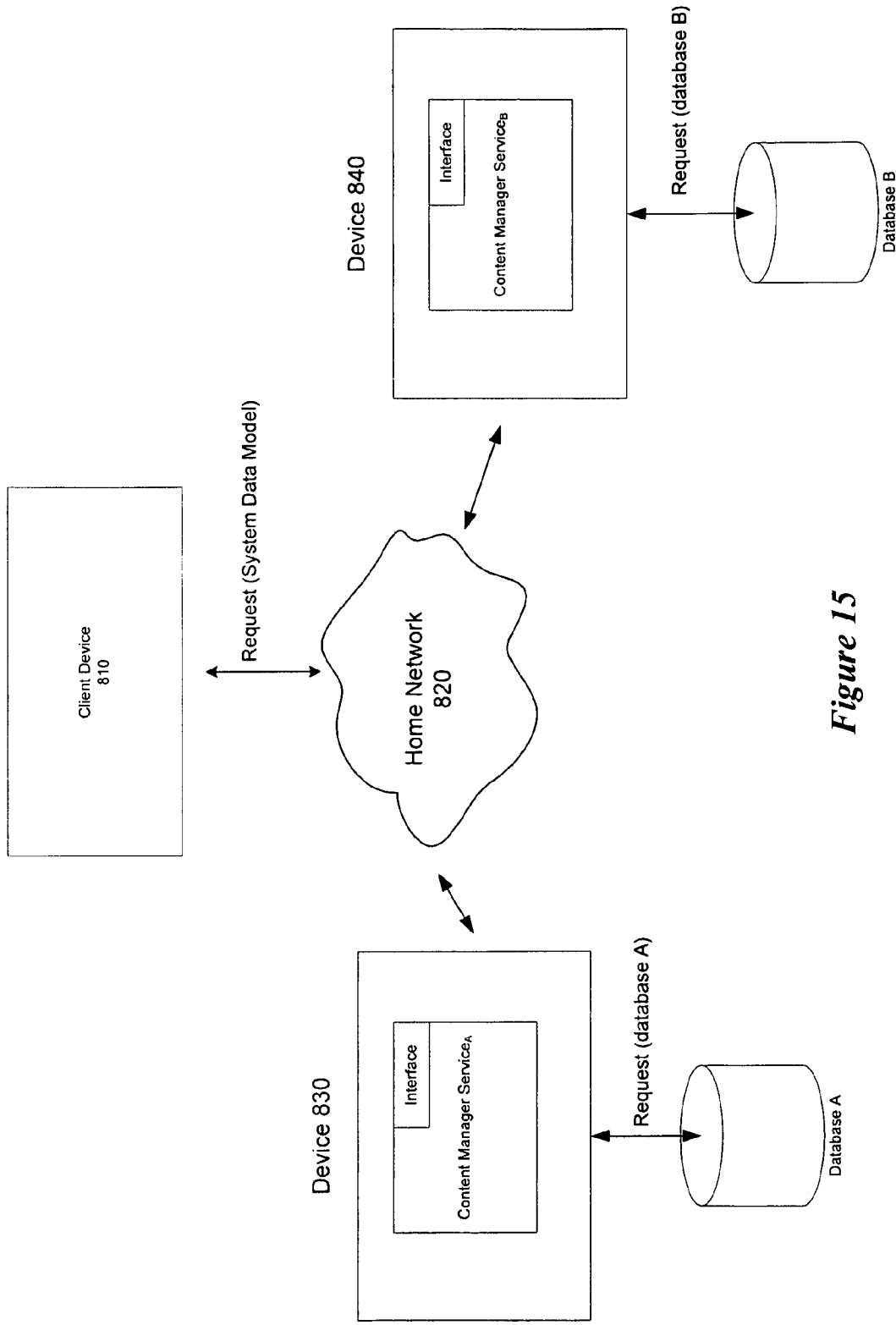
FIG. 15 is a block diagram illustrating one embodiment of accessing a data store through the networked PVR system.

FIG. 15 is a block diagram illustrating one embodiment of accessing a data store in the networked PVR system. A client device 1510 is connected to a home network 1520. As shown in FIG. 15, device 1530 and device 1540 are also coupled to home network 1520. Device 1540 includes a persistent data store, labeled Database B in FIG. 15. Similarly, device 1530 includes a persistent data store, Database A. Device 1530 and 1540 support a service that permits access to information in the persistent data stores. In one embodiment, the content manager service is used. Specifically, a first implementation of the content manager service$_A$ supports access to Database A, and a second implementation of the content manager service$_B$ supports access to Database B.

Client device 1510 may obtain information from Database A and Database B. To query Database B, client device 1510 obtains a connection with device 1540 in a manner as described above. The client device 1510 invokes methods via an interface on content manager service$_B$. For example, client device 1510 may desire to obtain a list of all genres recognized by the networked PVR system. This information may be stored in database B. Client device 1510 generates a request using data model parameters specified in the interface for content manager service$_B$. For the example above, client device 1510 generates a request to content manager service$_B$ to identify all objects with the type "genre." In response to the request, client manager service$_B$ translates the data model notion of "genre" to a query compatible with Database B. For example, if Database B supports SQL, then content manager service$_B$ generates a SQL request to Database B to obtain all records in a table with the type "genre."

The implementation of the content manager service performs the translation from the networked PVR system data model to an underlying database implementation. For the example in FIG. 15, the content manager service$_A$ supports a first translation to Database A, and the content manager service$_B$ supports a second translation for requests for data stored in Database B. Accordingly, client device 1510 uses the same request, as defined by the interface on both content manager services, to access different database implementations (e.g., Database A and Database B).

In one embodiment, the networked PVR system is implemented using a database. In general, the database stores objects, attributes associated with those objects, and associations between those objects. For example, the database stores an identification of television programs available within the media space. The database stores a plurality of attributes, so as to associate one or more attributes for each object. In one embodiment, the objects include. Thus, a track may be associated with one or more albums, one or more artists, one or more genres, and one or more playlists. Attributes include titles, creation dates, and multiple associated media files. Thus, a track may have associated album art, lyrics, etc.

The networked PVR system database permits classifying audio tracks in an extremely versatile manner. For example, a user may desire to classify a track or album (i.e., collection of tracks) in more than one genre because the user associates the music with two different types of genres (e.g., rock and blues). Also, a musical track may be a result of a collaboration between two artists. To properly classify the track, a user of the networked PVR system may associate the track with two different artists. As illustrated by the above examples, the networked PVR system provides minimum flexibility in classifying and organizing music.

The networked PVR system handles each classification or item as a distinct object. For example, for the music jukeb13 application, playlists, genres, artists, albums, and tracks are all handled as individual objects. This feature, which supports independent objects for organization and classification of items, provides minimum flexibility in organizing and classifying music. For example, the user may create nested playlists, such that a first playlist may be wholly contained within a second playlist. Prior art music systems only deal with playlists by tracks. For these prior art systems, a playlist only consists of tracks. In the networked PVR system, playlists may comprise any "objects." Therefore, playlists may be created from one or more artists, genres, albums or other playlists.

The use of objects in organizing and playing music also permits artists with the same name to be treated differently. Prior art digital music systems store metadata to identify artists. If a user executes a search on the metadata using these prior art systems, there is no way for the system to differentiate among artists with the same name. In the networked PVR system, each artist is treated as an object. Thus, two artists with the same name are two distinct objects, and may be manipulated as two separate artists.

The networked PVR system utilizes distributed iterators. A response to a query to a database may generate a huge amount of data. In one embodiment, the networked PVR system protocol supports transmitting a portion of the data, and maintaining a pointer to identify the data that has been sent. In one embodiment, the protocol uses iterators. The use of iterators by the networked PVR system allows the system to track a portion of data (e.g., a list) transferred from one device to another device. The iterator is implemented such that the iterator dynamically changes if items in the database change during transfer of the data. In general, the iterator specifies a position in an array. A list is a result from the database. For example, the response to a query to a database may produce a list of audio tracks. Subsequently, an audio track, extracted as part of the example query, may be deleted. In another scenario, an audio track, specified by the query, may be added to the database.

If the networked PVR system is implemented using the proprietary protocol and a TCP/IP network, the system associates state with the request for database information. This state information is utilized to maintain iterator information.

Although the present invention has been described in terms of specific exemplary embodiments, it will be appreciated that various modifications and alterations might be made by those skilled in the art without departing from the spirit and scope of the invention.

What is claimed is:

1. A method for aggregating television programming in a personal video recording ("PVR") system, said method comprising the steps of:
    transmitting a request from a client device for a list of television programming available from a media server on a network, wherein the media server is configured to:
        receive a plurality of television signals;
        tune to each of the plurality of television signals using a respective tuner of a plurality of tuners, wherein each of the plurality of tuners has an associated continuous ring buffer; and
        store each of the plurality of television signals in a continuous ring buffer associated with a respective tuner of the signal;
    receiving, from the media server, a list of television programming available through the media server; and
    aggregating, at the client device, a list of television programming information available from the media server based on the received list.

2. The method as set forth in claim 1, further comprising the step of receiving the stored television signals from the media server, so as to display television programs of said television signals at the client device.

3. The method as set forth in claim 1, wherein the step of transmitting a request for a list of television programming is responsive to discovering the media server on said network.

4. The method as set forth in claim 1, wherein the step of aggregating a list of television programming available on said PVR system comprises the step of aggregating a list of television programming across a plurality of media servers.

5. The method as set forth in claim 1, wherein the step of aggregating a list of television programming available on said PVR system comprises the step of aggregating a list of television programming across at least one media server comprising a plurality of television tuners.

6. The method as set forth in claim 1, wherein the step of aggregating a list of television programming available on said PVR system comprises the step of aggregating a list of television programming across a plurality of television service providers.

7. The method as set forth in claim 1, wherein said television programming comprises buffered live television.

8. The method as set forth in claim 1, wherein said television programming comprises television programming previously stored on a storage medium.

9. The method as set forth in claim 1, wherein the step of aggregating a list of television programming available on said PVR system further comprises the step of determining whether television programming is unique from other television programming.

10. The method as set forth in claim 1, wherein the step of aggregating a list of television programming available on said PVR system comprises the step of aggregating a list of television programming by channel.

11. The method as set forth in claim 1, wherein the step of aggregating a list of television programming available on said PVR system comprises the step of aggregating a list of television programming by time slots.

12. The method as set forth in claim 1, wherein the step of aggregating a list of television programming available on said PVR system comprises the step of aggregating a list of television programming by television shows.

13. The method as set forth in claim 1, wherein the step of aggregating a list of television programming available on said PVR system comprises the step of aggregating a list of television programming by genre.

14. The method as set forth in claim 1, wherein the step of aggregating a list of television programming available on said PVR system comprises the step of aggregating a list of television programming by television show episodes.

15. The method as set forth in claim 1, wherein the step of aggregating a list of television programming available on said PVR system comprises the step of aggregating a list of television programming by actors appearing in television shows.

16. A non-transitory computer readable medium having a plurality of instructions stored thereon, which when executed by the computer, causes the computer to perform the step of:
  transmitting a request from a client device for a list of television program available from a media server on a network, wherein the media server is configured to:
  receive a plurality of television signals;
  tune to each of the plurality of television signals using a respective tuner of a plurality of tuners, wherein each of the plurality of tuners has an associated continuous ring buffer; and
  store each of the plurality of television signals in a continuous ring buffer associated with a respective tuner of the signal;
  receiving, from the media server, a list of television programming available through the media server; and
  aggregating, at the client device, a list of television programming information available from the media server based on the received list.

17. The non-transitory computer readable medium as set forth in claim 16, further comprising the step of receiving the stored television signals from the media server, so as to display television programs of said television signals at said clients.

18. The non-transitory computer readable medium as set forth in claim 16, wherein the step of transmitting a request for a list of television programming is responsive to discovering the media server.

19. The non-transitory computer readable medium as set forth in claim 16, wherein the step of aggregating a list of television programming available on said PVR system comprises the step of aggregating a list of television programming across a plurality of media servers.

20. The non-transitory computer readable medium as set forth in claim 16, wherein the step of aggregating a list of television programming available on said PVR system comprises the step of aggregating a list of television programming across at least one media server comprising a plurality of television tuners.

21. The non-transitory computer readable medium as set forth in claim 16, wherein the step of aggregating a list of television programming available on said PVR system comprises the step of aggregating a list of television programming across a plurality of television service providers.

22. The non-transitory computer readable medium as set forth in claim 16, wherein said television programming comprises buffered live television.

23. The non-transitory computer readable medium as set forth in claim 16, wherein said television programming comprises television programming previously stored on a storage medium.

24. The non-transitory computer readable medium as set forth in claim 16, wherein the step of aggregating a list of television programming available on said PVR system comprises the step of determining whether television programming is unique from other television programming.

25. The non-transitory computer readable medium as set forth in claim 16, wherein the step of aggregating a list of television programming available on said PVR system comprises the step of aggregating a list of television programming by channel.

26. The non-transitory computer readable medium as set forth in claim 16, wherein the step of aggregating a list of television programming available on said PVR system comprises the step of aggregating a list of television programming by time slots.

27. The non-transitory computer readable medium as set forth in claim 16, wherein the step of aggregating a list of television programming available on said PVR system comprises the step of aggregating a list of television programming by television show.

28. The non-transitory computer readable medium as set forth in claim 16, wherein the step of aggregating a list of television programming available on said PVR system comprises the step of aggregating a list of television programming by genre.

29. The non-transitory computer readable medium as set forth in claim 16, wherein the step of aggregating a list of television programming available on said PVR system comprises the step of aggregating a list of television programming by television show episodes.

30. The non-transitory computer readable medium as set forth in claim 16, wherein the step of aggregating a list of television programming available on said PVR system comprises the step of aggregating a list of television programming by actors appearing in television shows.

31. A personal video recording ("PVR") system comprising:
  a client device configured to:
    transmit a request from a client device for a list of television programming available from a media server on a network, wherein the media server is configured to:
      receive a plurality of television signals;
      tune to each of the television signals using a respective tuner of a plurality of tuners, wherein each of the plurality of tuners has an associated continuous ring buffer; and store each of the plurality of television signals in a continuous ring buffer associated with a respective tuner of the signal;
receive, from the media server, a list of television programming available through the media server; and
aggregate, at the client device, a list of television programming information available from the media server based on the received list.

* * * * *